United States Patent
Boerup

(10) Patent No.: US 11,675,249 B2
(45) Date of Patent: Jun. 13, 2023

(54) OBSTRUCTION FREE SOFTBOX

(71) Applicant: MGMD BrainPower LLC, Tucson, AZ (US)

(72) Inventor: Spencer Boerup, Tucson, AZ (US)

(73) Assignee: MGMD BrainPower LLC, Tucson, AZ (US)

( * ) Notice: Subject to any disclaimer, the term of this patent is extended or adjusted under 35 U.S.C. 154(b) by 0 days.

(21) Appl. No.: 17/700,130

(22) Filed: Mar. 21, 2022

(65) Prior Publication Data

US 2022/0276546 A1    Sep. 1, 2022

Related U.S. Application Data

(63) Continuation of application No. 16/437,660, filed on Jun. 11, 2019, now Pat. No. 11,281,073.

(60) Provisional application No. 62/683,968, filed on Jun. 12, 2018.

(51) Int. Cl.
  *G03B 15/06* (2021.01)
  *F21V 7/18* (2006.01)

(52) U.S. Cl.
  CPC .......... *G03B 15/06* (2013.01); *F21V 7/18* (2013.01); *G03B 2215/0525* (2013.01)

(58) Field of Classification Search
  CPC ...... G03B 15/06–07; G03B 2215/0575; F21V 7/18
  See application file for complete search history.

(56) References Cited

U.S. PATENT DOCUMENTS

| | | | |
|---|---|---|---|
| 2,205,860 A * | 6/1940 | Olds | G03B 15/0442 362/17 |
| 4,527,166 A | 7/1985 | Luly | |
| 5,841,146 A | 11/1998 | Briese | |
| 8,157,397 B2 * | 4/2012 | Briese | G03B 15/02 362/18 |
| 8,833,951 B1 | 9/2014 | Pavlenko | |
| 2002/0141172 A1 | 10/2002 | Shirilla | |
| 2013/0322051 A1 | 12/2013 | Ortiz-Gavin | |
| 2014/0192510 A1 | 7/2014 | Kim | |
| 2015/0168812 A1 * | 6/2015 | Ortiz-Gavin | G03B 15/06 362/18 |

FOREIGN PATENT DOCUMENTS

| | | |
|---|---|---|
| CN | 2600839 Y * | 1/2004 |
| CN | 201326969 Y * | 10/2009 |

(Continued)

OTHER PUBLICATIONS

PCT International Search report and Written Opinion in International Application PCT/US2019/036686, dated Oct. 4, 2019, 11 pgs.

*Primary Examiner* — Mariceli Santiago

(57) ABSTRACT

A softbox for use with a light source has structures to collapse the softbox. These structures include a ring-support assembly. The ring support assembly includes a support ring and a light ring, both of which couple to frame arm assembly. The frame arm assembly supports the material of the softbox. When the support ring and light ring are separated, the frame collapses. The structures of the light box may be entirely disposed outside of the direct path of the light source to the target, facilitating, in part, the softbox being integrated with other light manipulating devices proximal to the light source.

11 Claims, 21 Drawing Sheets

(56) References Cited

FOREIGN PATENT DOCUMENTS

| | | | | |
|---|---|---|---|---|
| KR | 1127458 B1 | * | 3/2012 | ................ F21V 7/18 |
| KR | 10-1215717 | | 1/2013 | |
| KR | 10-1254900 | | 4/2013 | |
| KR | 10-1827628 | | 3/2018 | |
| WO | WO-2019048908 A1 | * | 3/2019 | ............ F21V 7/0008 |

* cited by examiner

OBSTRUCTION FREE SOFTBOX

CROSS-REFERENCE TO RELATED APPLICATIONS

This application is a continuation of U.S. Non-Provisional application Ser. No. 16/437,660, filed Jun. 11, 2019, issued as U.S. Pat. No. 11,281,073, which claims priority to and the benefit of U.S. Provisional Application No. 62/683,968, filed Jun. 12, 2018, titled "OBSTRUCTION FREE SOFTBOX," the disclosures of which are hereby incorporated by reference herein in their entirety.

INTRODUCTION

Effective light manipulation and control is useful for those in the film and photography industry. Indeed, the use of soft boxes, filters, grids, gels, cones, and other light manipulating devices is typical in modern photography and film industries.

One way to manipulate light is through the use of softboxes. Softboxes are used to confine light and direct the light toward a target of the film/photographs. Softboxes are often large, and thus some softboxes are designed to be semi-collapsible to ease in transport and storage. Additionally, softboxes have support structures to aid in keeping the softbox's shape, which shape may be dome or rectangular prism.

The typical softbox design, however, has several problems. For example, in some instances the current support mechanisms and collapsible mechanisms obstruct the light coming from the light source. Further, the current design prevents the combination of light manipulating devices to be used at the light source, such as filters and grids.

It is with respect to these and other considerations that the technologies described below have been developed. Also, although relatively specific problems have been discussed, it should be understood that the embodiments should not be limited to solving the specific problems identified in the introduction.

Obstruction Free Softbox

Aspects of technology include a softbox capable of collapsing in volume. The collapsible softbox may be used with a portable light source, such as a flash or other mounted light source. The use of the collapsible softbox may create a softened and/or a more even light distribution for photographic and film purposes. In aspects, the framing mechanism used to support the softbox body and/or the collapsible mechanisms used to facilitate the collapse of the softbox does not directly obstruct light coming from the light source. Additionally, the collapsible softbox described herein may include the ability to receive various light manipulating devices, including gels, filters, and grids, proximate to the light source.

In aspects of the technology, a softbox includes a support ring having an outer annular surface and an inner annular surface defining a support-ring opening. The softbox may further include a light ring disposed on a front side of the support ring. The light ring may have an outer annular surface and an inner annular surface defining a light-ring opening. The light-ring may have an opening that aligns with the support-ring opening such that the light from a light source may pass through both the support-ring opening and the light-opening. The softbox may further include a plurality of frame-arm assemblies. The plurality of frame-arm assemblies may include a first frame-arm assembly and a second frame-arm assembly. The first-frame arm assembly may further include a first frame-arm having a distal end and a proximal end, the proximal end of the first frame-arm being pivotally coupled to the outer annular surface of the support ring. Additional aspects of the innovative technology include a first pivot-arm having a distal end and a proximal end, the proximal end of the first pivot-arm being pivotally coupled to the outer annular surface of the light ring, and the distal end of the first pivot-arm being pivotally coupled to the first frame arm. The second-frame arm assembly may include a second frame-arm having a distal end and a proximal end. The proximal end of the second frame-arm may be pivotally coupled to the outer annular surface of the support ring. The second pivot-arm may have a distal end and a proximal end. The proximal end of the second pivot-arm may be pivotally coupled to the outer annular surface of the light ring. The distal end of the second pivot-arm may be pivotally coupled to the second frame arm.

In aspects of the technology, moving the support ring away from the light ring causes the distal end of the first frame arm to move closer to the distal end of the second frame arm. The softbox may further include a plurality of receiving elements protruding from a front face of the light ring and adapted to receive a light manipulating device. In aspects of the technology, the light manipulating device is a gel. In aspects of the technology, the receiving elements are fins that taper outwardly from the opening of the light ring.

In aspects of the technology, the frame arm assembly elements are entirely outside of the volume of a space having a base and a height, the base being defined by the area of the opening, and the height being defined as the length of a line starting perpendicular to a first plane formed by the inner annular surface of the opening of the light ring and terminating at a second plane formed by distal ends of at least three of the plurality of frame arm assemblies, wherein the first plane and the second plane are parallel to each other. The soft box may further include a webbing having a webbing opening defined by an interior perimeter and a distal edge, wherein the interior perimeter is coupled to the outer annular surface of the support ring, and further wherein the distal end of the frame arm is coupled to the webbing at coupling locations. In aspects of the technology, the coupling locations proximate to the distal edge of the webbing. In aspects of the technology, the support ring has coupling channels disposed on a front face, and the coupling channels are adapted to receive coupling members disposed on a back face of the light ring.

Additional aspect of the technology include, a system including: a softbox including: a ring assembly defining an opening and including a support ring and a light ring axially movable relative to one another along a center axis; a plurality of frame-arm assemblies, each frame-arm assembly including a frame-arm pivotally coupled to the support ring at a proximal end and a pivot-arm pivotally coupled to the light ring at a proximal end and pivotally coupled to the frame arm at a distal end, wherein when the support ring and the light ring move away from each other, a distal end of each of the frame-arms collapse towards the center axis; and a body supported by the plurality of frame-arm assemblies; and a light manipulating device removably coupled to the light ring.

In an example, the light manipulating device includes a gel, a lens filter, or a grid. In another example, the light ring includes a front face with a plurality of fin sections and a plurality of curved sections adapted to receive the light manipulating device. In still another example, the support ring includes one or more attachment elements adapted to couple to a light source. In yet another example, the distal end of the pivot-arm is coupled proximate to the proximal end of the frame-arm. In an example, when the support ring and the light ring are adjacent one another, at least a portion of the support ring is received within the light ring. In another example, when the support ring is received within the light ring, the distal end of each of the frame-arms are positioned furthest away from the center axis. In still another example, the body is at least partially formed from a reflective material. In yet another example, the plurality of frame-arm assemblies are disposed within the body.

In another aspect of the technology, a method for collapsing a softbox includes: providing the softbox having a ring assembly with a support ring and a light ring, a plurality of frame-arm assemblies, each frame-arm assembly having a frame-arm pivotally coupled to the support ring at a proximal end and a pivot-arm pivotally coupled to the light ring at a proximate end and pivotally coupled to the frame-arm at a distal end, and a body supported by the plurality of frame-arm assemblies; separating the light ring from the support ring; and substantially simultaneously with separating the light ring from the support ring, collapsing a distal end of each of the frame-arms towards a center axis. In an example, the support ring and the light ring are substantially parallel to one another while being separated.

These and various other features as well as advantages that characterize the systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claim hereof as well as the appended drawings.

It is to be understood that both the foregoing introduction and the following detained description are exemplary and explanatory and are intended to provide further explanation of the invention as claimed.

BRIEF DESCRIPTION OF THE DRAWINGS

Non-limiting and non-exhaustive embodiments are described with reference to the following figures.

DETAILED DESCRIPTION

Aspects of the technology relate to a collapsible softbox. The collapsible softbox may or may not include a support ring that is configured to removably receive light modification devices (e.g. gels). One advantage of the collapsible softbox disclosed in this application includes the collapsible elements not substantially obstructing the path of the light from the light source (e.g., a speed light) to the target (e.g., the subject of the photograph) when in an open position. Additionally, the support ring may be configured to receive light modification devices.

Figure 1A:
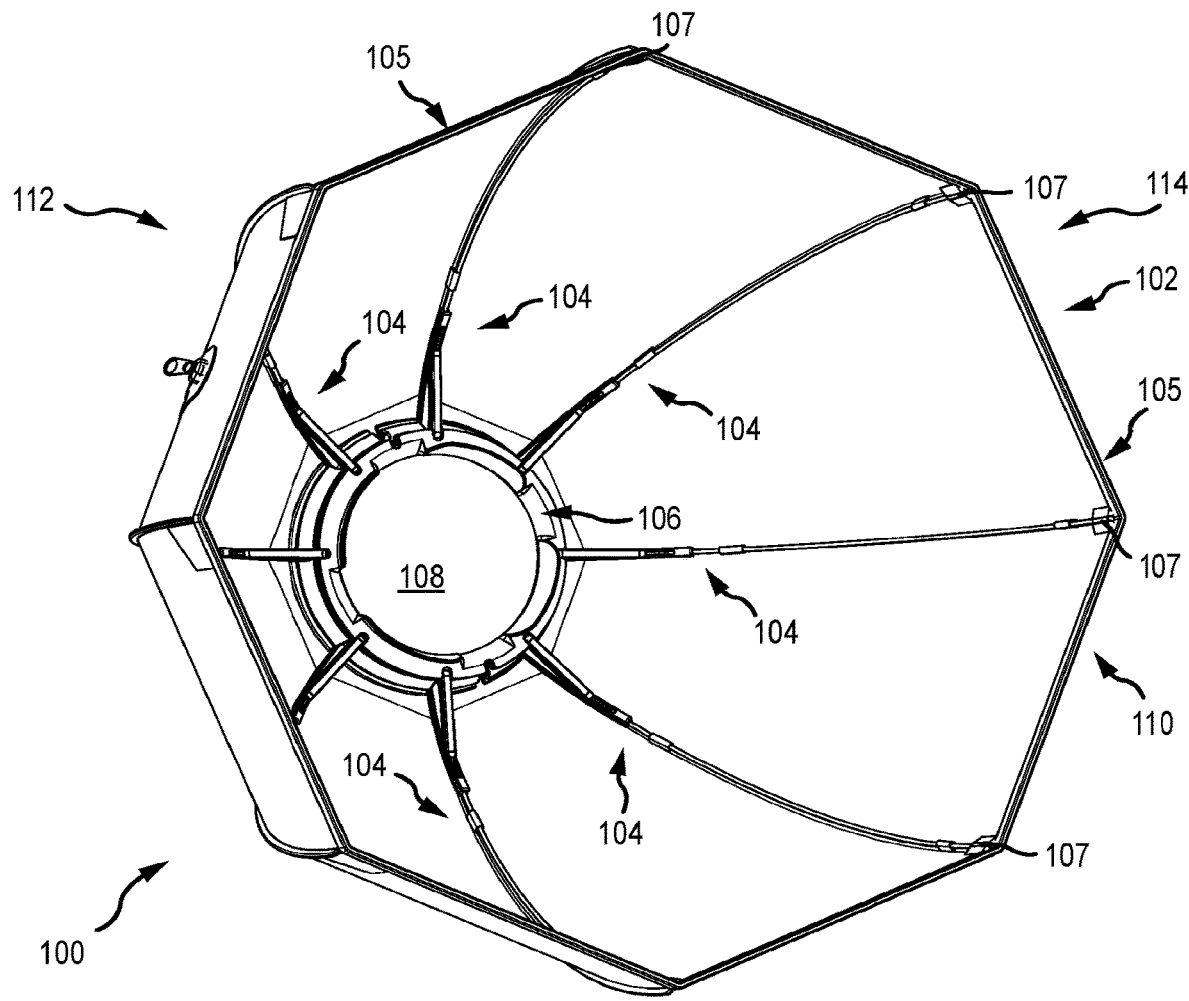
FIG. 1A is a perspective view of an embodiment of an obstruction-free collapsible softbox in an expanded position.
Figure 1B:
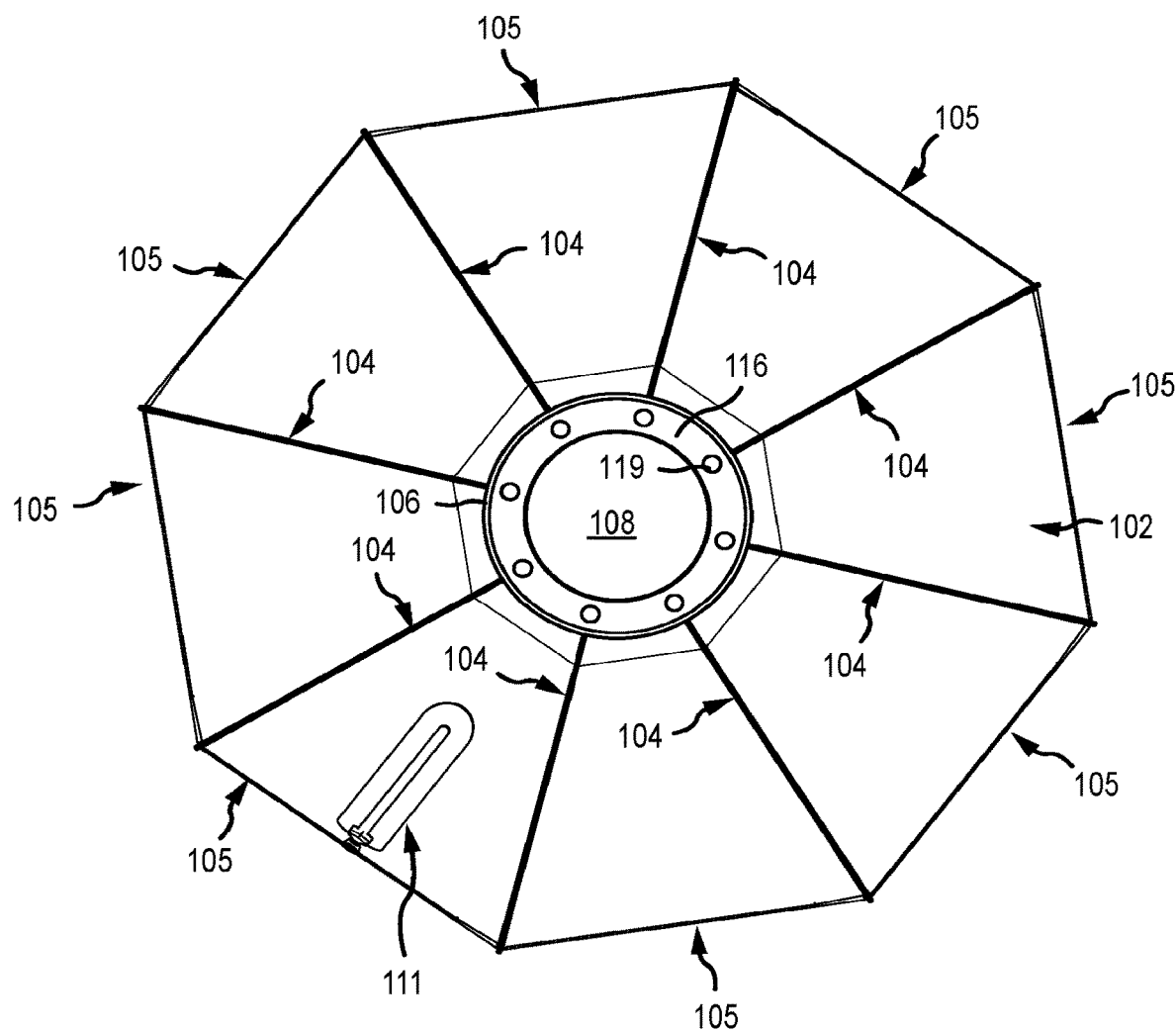
FIG. 1B is a front view of an embodiment of an obstruction-free collapsible softbox in an expanded position.
Figure 1C:
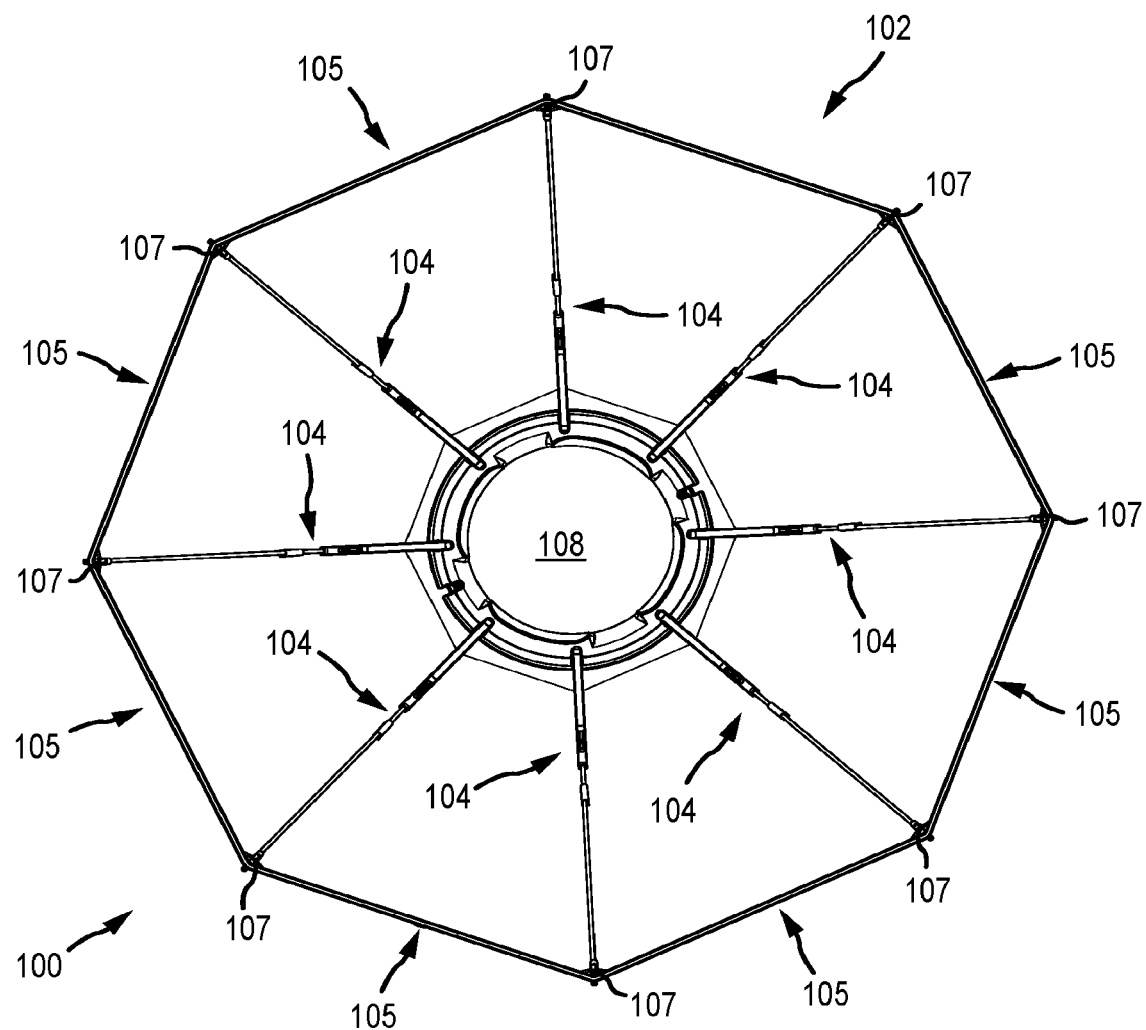
FIG. 1C is a back view of an embodiment of an obstruction-free collapsible softbox in an expanded position.
Figure 1D:
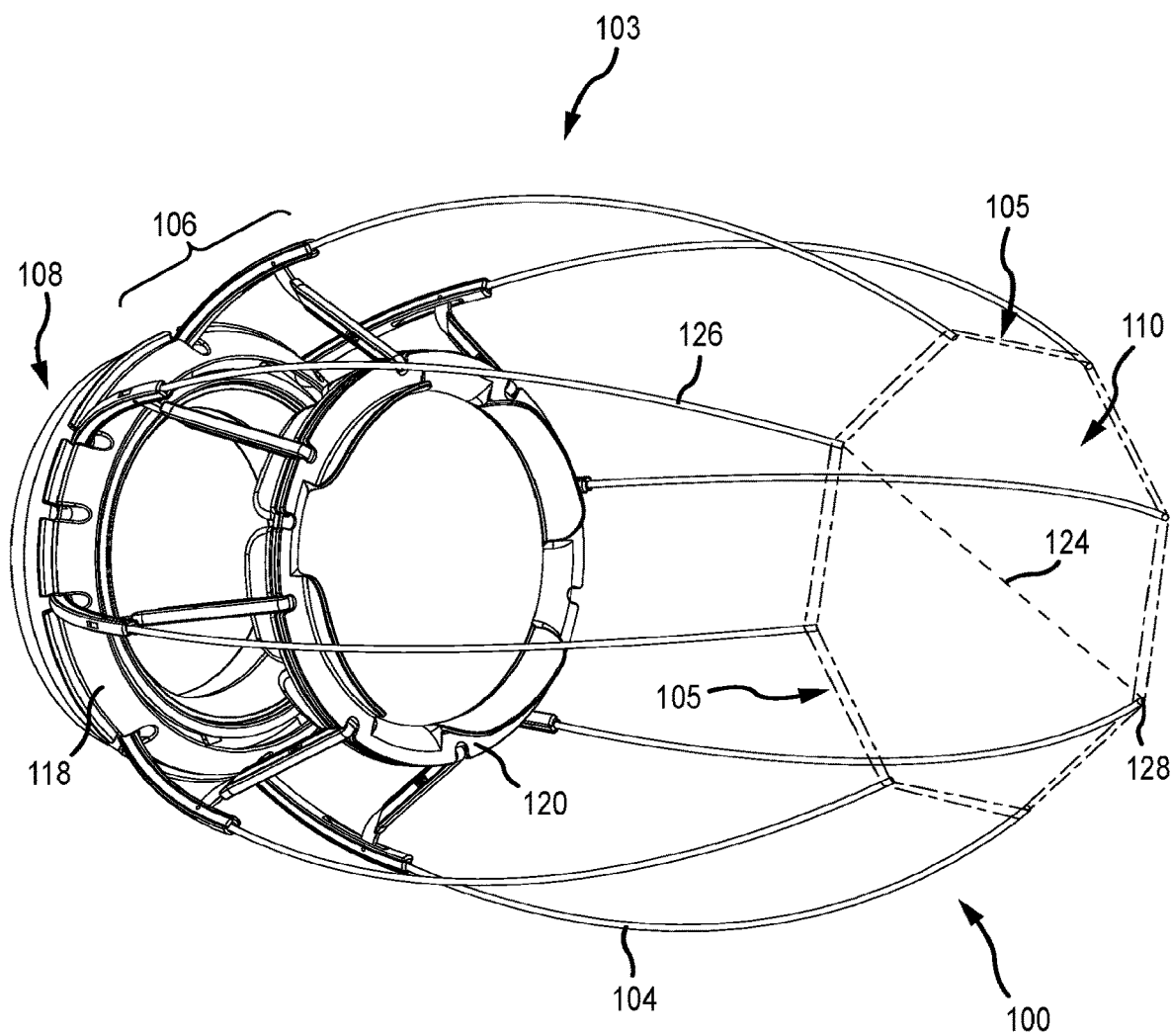
FIG. 1D is a perspective view of an embodiment of an obstruction-free collapsible softbox in a collapsed position.

FIGS. 1A-1D illustrate various views of an embodiment of an obstruction-free collapsible softbox 100. FIGS. 1A-1C illustrate the softbox in an expanded position, whereas FIG. 1D illustrates the softbox in a closed position. As illustrated, the obstruction-free collapsible softbox 100 includes a body 102. The body 102 may include a cloth, webbing, or other flexible/semi-flexible, collapsible material. In aspects of the technology, the material of the body 102 has semi-opaque, reflective, and/or fully opaque properties to direct light from a light source to a target. The body 102 is supported by a collapsible-frame assembly 103. The collapsible frame assembly 103, and example components, are described in more detail with references to FIGS. 2-7.

In aspects of the technology, the collapsible-frame assembly 103 includes a frame-arm assembly 104. As illustrated, the material of the body 102 couples to the frame-arm assemblies 104 at coupling locations 107. The coupling locations may be near the distal edge 105 of the body 102. Coupling may occur through a variety of mechanisms. For example, an insert or receiving tab may be sewn or otherwise coupled to the body 102 at the coupling locations 107. In aspects, an insert or receiving tab may facilitate the distal end of the frame-arm assembly 104 removably-inserting into the distal end of the body 102. Other coupling means are contemplated including rivets, pins, screws, nails, adhesive, and any other means now known or later developed suitable for coupling the body to the distal end portion (or other portion) of a plurality of frame-arm assemblies 104.

In aspects, the material of the body 102 defines an opening, which is proximate to the support-ring assembly, that fits around or is coupled to a support-ring assembly 106. For example, the perimeter of the opening defined by the body 102 may be coupled to the perimeter of the support-ring assembly 106. In aspects, the support-ring assembly 106 includes a support ring 118 and a light ring 120. As such, the perimeter of the opening defined by body 102 may couple to either the outer annular edge of either the support ring 118 or the light ring 120 of the support-ring assembly 106. As illustrated in FIG. 1D, the perimeter of the body defining an opening is coupled to the support ring 118. In aspects, the material/webbing of the body is stretched over the support ring 118 of the support-ring assembly such that the fabric is held in place by friction. In other embodiments, coupling may occur in a variety of ways, including through the use of rivets, pins, screws, nails, adhesive, and any other means now known or later developed suitable for such purposes.

Coupling the body 102 to the perimeter of the support ring assembly 106 or the light ring 120 allows the body 102 to be stretched from the support-ring assembly 106 to the distal end of the collapsible frame-arm assemblies 104. Thus, the body 102 may form a variety of shapes, including a frusto-conical shape, rectangular prism shape, or, as illustrated, a dome shape. In aspects of technologies, the result is such that the collapsible softbox 100 has a proximal opening 108 and a distal opening 110. In aspects, the body 102 forms a convex shape over the collapsible frame assembly 103 on the back side 112 of the collapsible softbox 100, and the body 102 forms a concave shape on the front side 114 of the collapsible softbox 100.

As illustrated, the back side of the ring assembly 116 includes a light coupling mechanism 119. The light coupling mechanism is a mechanism, such as magnets, hook and loop fastener, peg and hole, etc., that enables the back side of the ring assembly 116 to couple to a lighting source that has been adapted to receive such a mechanism. In aspects of the technology, the collapsible softbox 100 couples to a light source via a coupling mechanism 119 that are magnets, which are magnetically attracted to a Ferro-magnetic plate of the light source, for example.

Illustrated in FIG. 1D is a perspective view of an embodiment of an obstruction-free collapsible softbox 100 in a collapsed position. It will be appreciated that the body 102 has been removed for clarity. In a collapsed position the support-ring assembly 106 separates into two rings, a support ring 118 and a light ring 120. When in a collapsed position, the distance 124 between the distal end of a first collapsible frame-arm assembly 126 and the distal end of a second collapsible frame arm assembly 128 is reduced. This may aid in the transport and storage of the collapsible softbox 100.

Figure 2A:
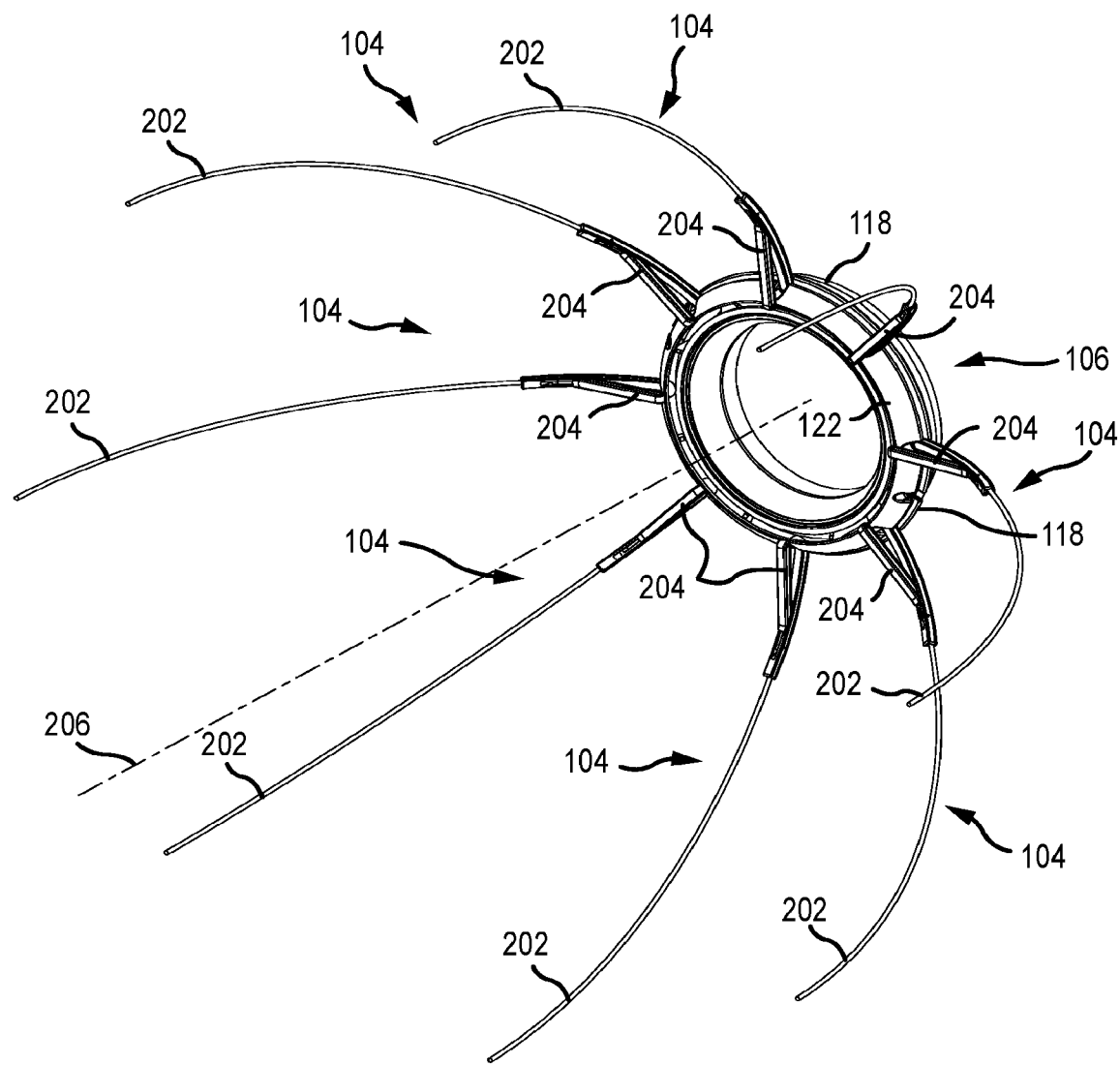
FIG. 2A is a perspective view of an embodiment of a collapsible frame assembly in an expanded position.
Figure 2B:
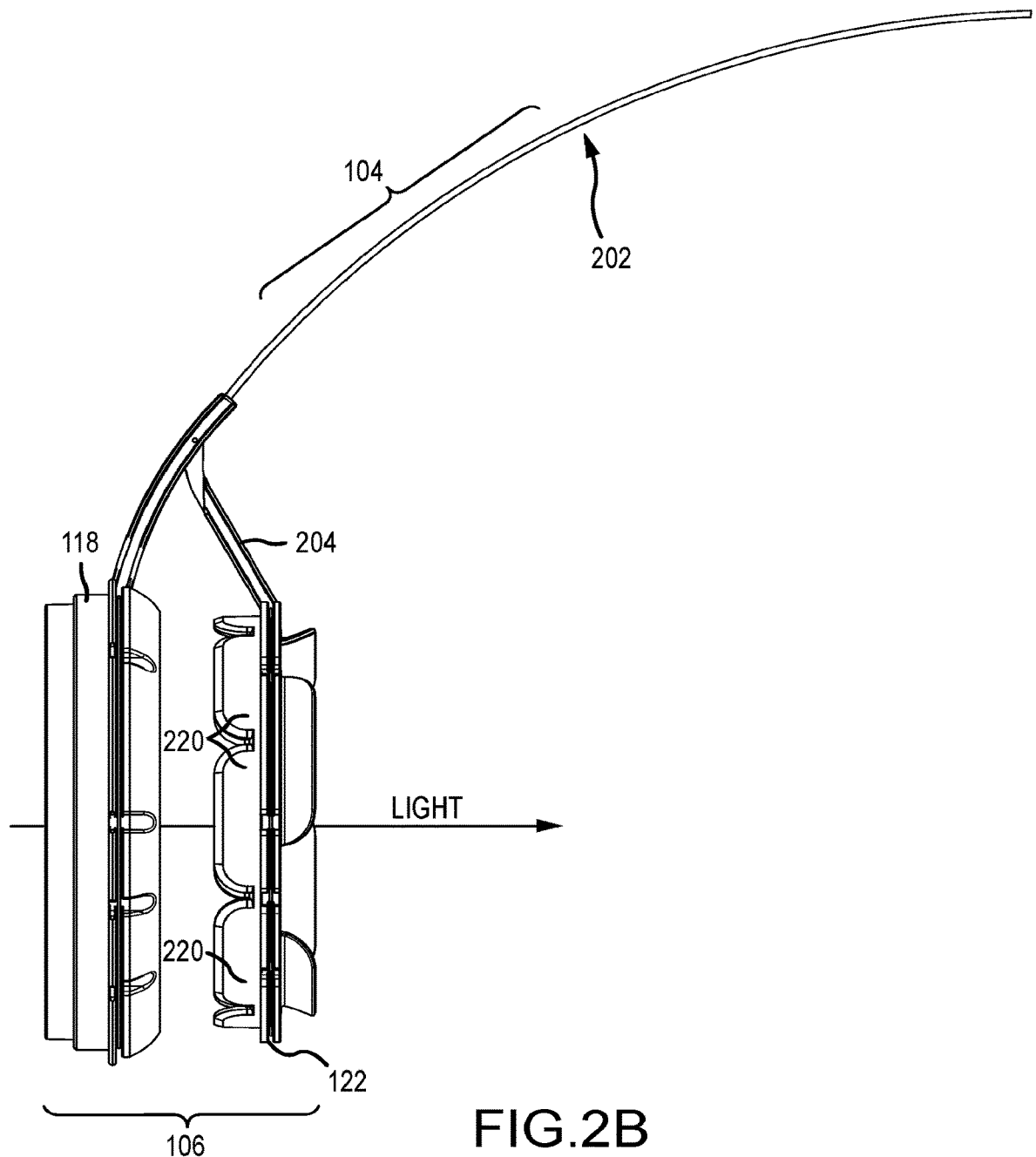
FIG. 2B is a side view of an embodiment of a collapsible frame assembly in a collapsed position.

FIG. 2A illustrates a perspective view of an example of a collapsible frame assembly 103 in an expanded position. FIG. 2B illustrates a side view of an example of a collapsible frame assembly 103 in a collapsed position. For clarity, only one frame arm assembly 104 is illustrated in FIG. 2B, but it will be appreciated that all of the frame arm assemblies described herein may share the same or similar properties.

As illustrated, collapsible frame-arm assembly 104 includes a frame arm 202 and a pivot arm 204. In the example, the proximal end of the frame arm 202 is pivotally coupled to the perimeter of the support ring 118 of the support-ring assembly 106. Pivotal coupling may occur using a variety of means including a screw, hinge, pin, or other means. The frame arm 202 may include a channel to receive a distal end of the pivot arm 204. In alternative embodiments, the pivot arm 204 may include an integrated hinge in the body of the frame arm 202. Elements of a frame arm 202 are further discussed with reference to FIG. 5, and elements of the pivot arm are further discussed with reference to FIG. 4.

As illustrated, the distal end of the pivot arm 204 is coupled to the proximal end of the frame arm 202. In aspects of the technology, the distal end of the pivot arm 204 is pivotally inserted into a channel of the frame arm 202 such that the distal end of pivot arm 204 may pivot around the connection point. As illustrated, the proximal end of the pivot arm 204 is pivotally coupled to the light ring 122 of the support-ring assembly 106.

In an expanded position, as illustrated in FIG. 2A, the support ring 118 and the light ring 122 may be robustly coupled. This may allow light from a light source coupled to the back side of the support ring 118 to pass through support ring 118 and the light ring 122 relatively unobstructed. As illustrated, the frame-arm assemblies 104 to not obstruct light passing through the support ring 118 and the light ring 122, when the light is parallel to the a center axis 206 of the frame assembly 103.

To aid in robust coupling, the support ring 118 may have one or more light ring receiving elements on a front face of the support ring 118. The receiving elements may be adapted to receive coupling members 220. As illustrated, the coupling members 220 are pegs of fins protruding outwardly from a face of the light ring 122. The pegs may removably insertable into the receiving elements so as to facilitate positioning of the light ring 122 with respect to the support ring when in the expanded position. In other embodiments, the receiving elements may be a seat and the coupling members may be protrusions that rest in the seat. In alternative embodiments, there are no coupling members.

In a collapsed position, as illustrated by FIG. 2B, the support ring 118 and the light ring 122 separate along an axial direction. This movement pivots the pivot arm 204 relative to the light ring 122 and draws the distal end of the frame arm 202 inwards towards the center axis 206. In aspects of the technology, when in a collapsed position, the proximal ends of the frame arms move toward the center 206 of the collapsible-frame assembly 103.

Figure 3:
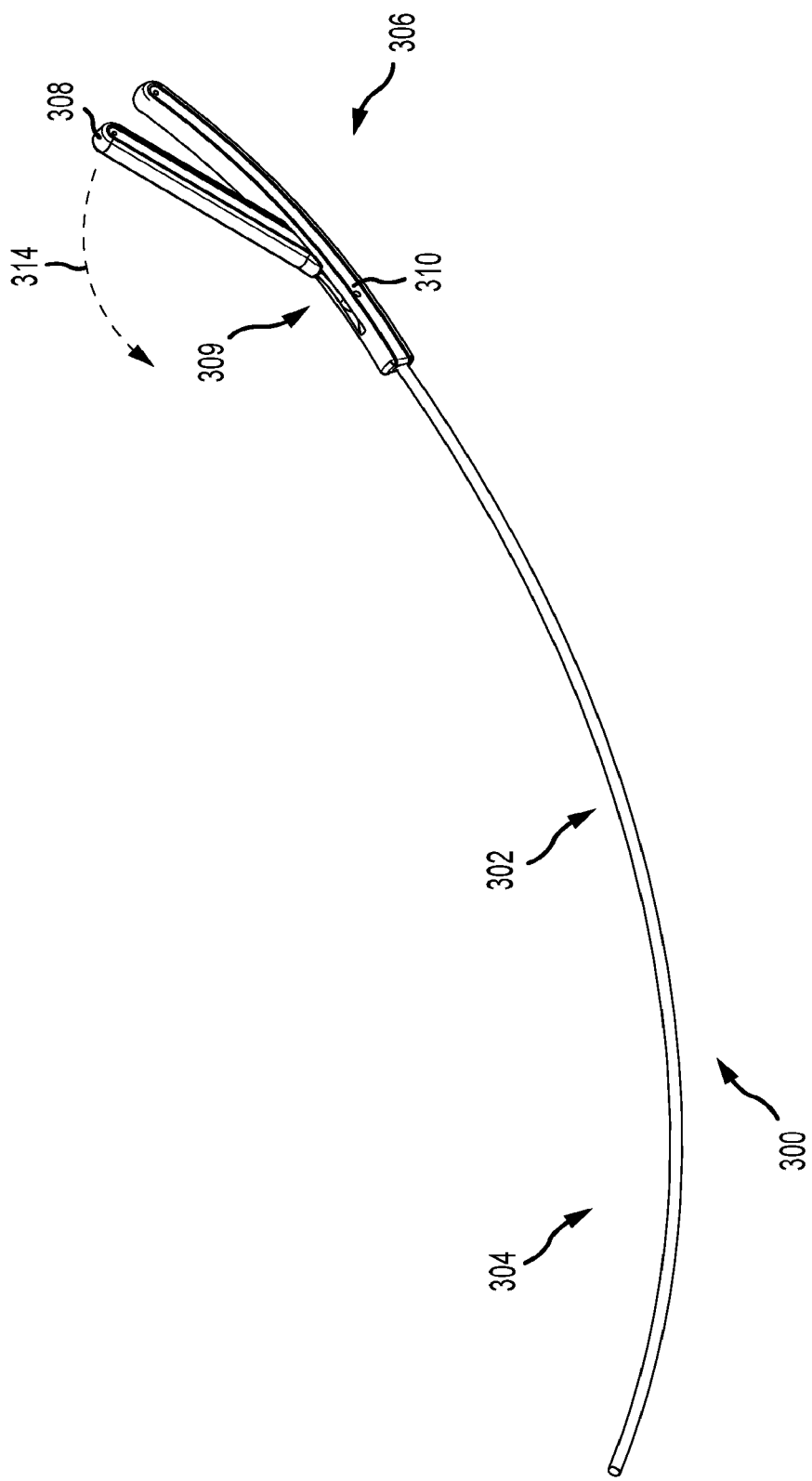
FIG. 3 illustrates an embodiment of a collapsible frame-arm assembly.

FIG. 3 illustrates an embodiment of a collapsible frame-arm assembly 300 with a distal-portion 304 (also referred to as a distal end) and a proximal-portion 306 (also referred to as a distal end). The proximal-portion 306 is nearest the light source/ring assembly when used in a collapsible softbox as described herein. Opposite the proximal-portion 306 is the distal-portion 304, which may be coupled to the body of a collapsible light box.

As illustrated, the collapsible frame-arm assembly 300 includes a frame arm 302. Further as illustrated, the frame arm includes a channel 309, which is adapted to receive a pivot arm, such as pivot arm 308. The pivot arm 308 is shown as being inserted into a channel 309. A coupling element 310 may couple a distal-portion of the pivot arm 308 to the frame arm 302. The coupling element 310 may allow the pivot arm 308 to pivot around an axis of rotation 314. The coupling element may be a screw, pin, or nail that is inserted into a side bore 310 of the frame arm 302 and through a bore at the distal end of the pivot arm 308.

Figure 4:
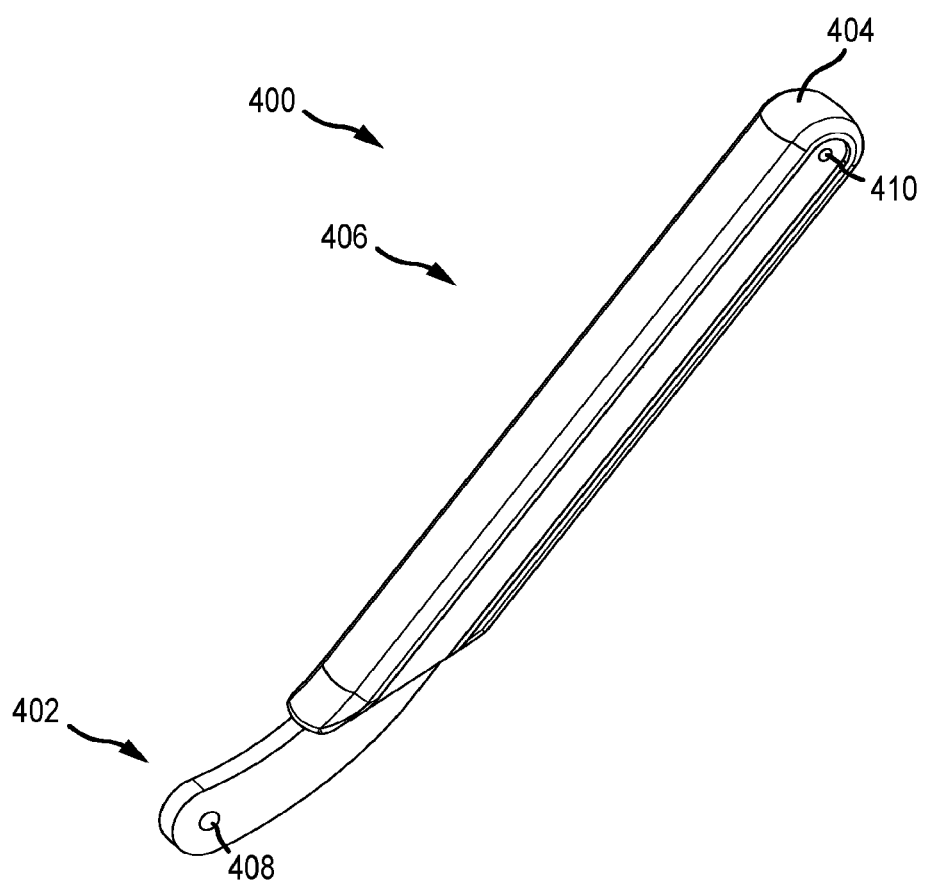
FIG. 4 illustrates an embodiment of a pivot arm.

FIG. 4 illustrates an embodiment of a pivot arm 400. As illustrated, pivot arm 400 has a body 406 that includes a distal portion 402 (also referred to as a distal end), and a proximal portion 404. As illustrated, the distal portion 402 includes a bore 408 operative to receive a pivot element (such as a screw or pin). When in use, the distal portion 402 couples to a frame arm, such as a channel of a frame arm. In aspects, the pivot element facilitates the pivoting of the pivot arm 400 about axis of rotation when the distal portion 402 is inserted into a channel (or otherwise coupled to) a proximal end of frame arm, such as the frame arm described herein.

The body 406 of the pivot arm may be of unitary construction, and may be made of a semi-flexible or flexible metal/and or plastic. As illustrated, the body 406 is a shaft having a dog-leg. In other embodiments, the body 406 may be a rod, a tube, a dowel or the like. The body need not have a dog leg, and may be straight or curved.

Further the proximal portion 404 is illustrated as having a bore 410. When used in conjunction with a collapsible softbox, the proximal end portion couples to a light ring of a support ring assembly. The bore 410 may receive a pivot element, such as screw or pin, which facilitates the pivoting of the pivot arm 400 about the bore 410.

Figure 5:
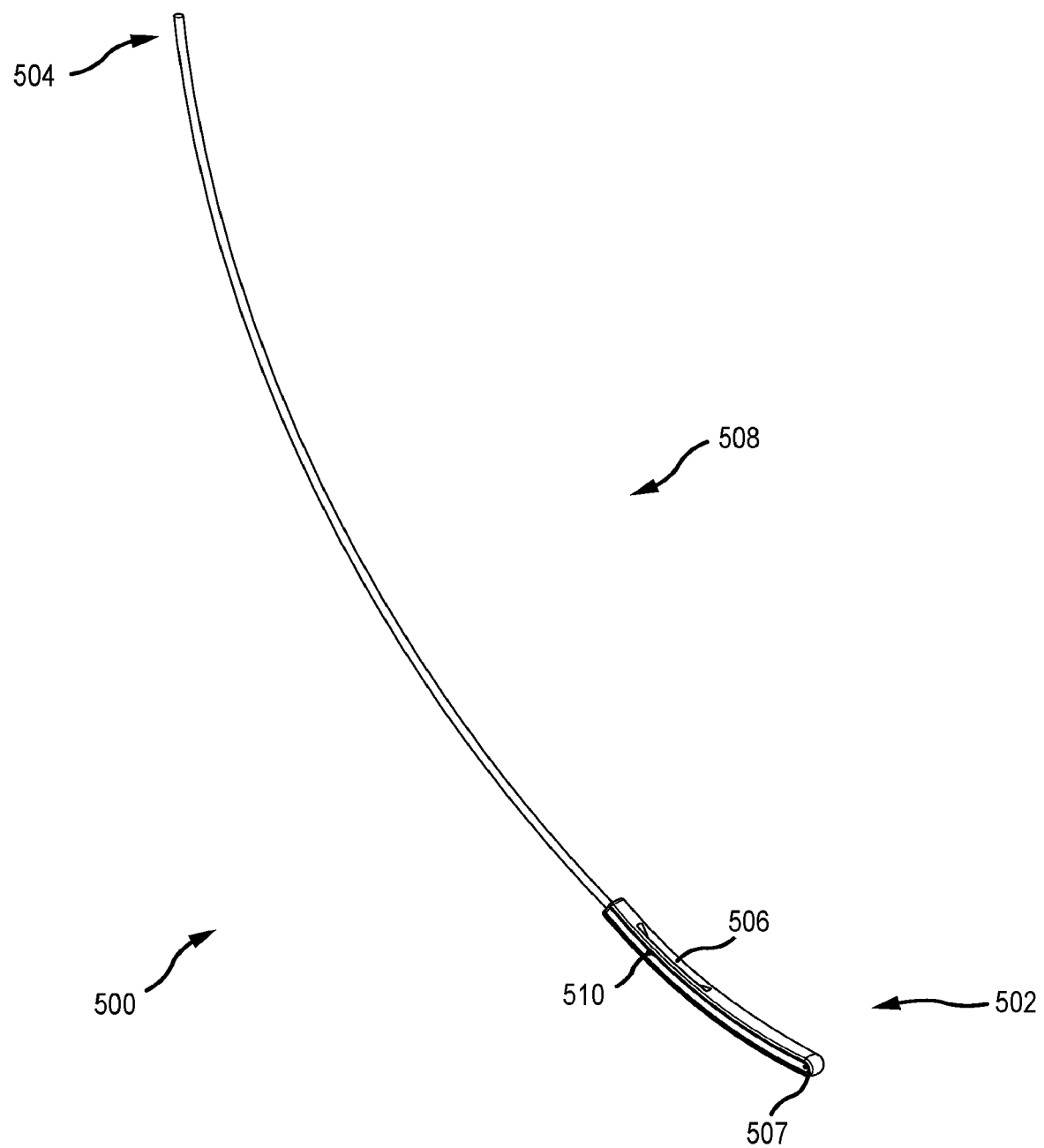
FIG. 5 illustrates an embodiment of a frame arm.

FIG. 5 illustrates an embodiment of a frame arm 500. Frame arm 500 includes a body 508 having a proximal portion 502 (also referred to as a proximal end), a distal portion 504 (also referred to as a distal end 504), and a channel 506. The body 508 of the frame arm 500 is illustrated as being a slightly curved rod. The curved shape of the rod at least partially defines the overall shape of the softbox in the expanded position. In other embodiments, the body 508 is straight rod. Indeed, the body 508 may be of another shape such as a tube, dowel, or the like capable of supporting a body of a collapsible softbox. In an embodiment, the body 508 may be made of a flexible plastic or flexible metal. In aspects of the technology, a flexible plastic or flexible metal aids collapsing or expanding the softbox.

The proximal portion 502 of the frame arm 500 may have a bore 507 or other connection element to facilitate connecting the proximal portion to a support ring of a support-ring assembly. For example, the bore may receive a screw or pin, which enables the connection element to couple to the perimeter of a support ring as described herein.

In aspects of the technology, the body defines a channel 506. The channel 506 may be sized to fit a distal portion of a pivot arm, such as the pivot arm described above. The distal portion of the pivot arm may be inserted into the channel 506. A screw and bolt or other connection element may pivotally couple the distal end of the pivot arm to the proximal portion 502 of the frame arm 500. In aspects, a channel bore 510 is operative to receive the connection element, such as a pin or a screw. It will be appreciated that other ways of pivotally connecting the frame arm 500 to a pivot arm are contemplated. For example, the pivot arm and the frame arm 500 may be hinged together.

Figure 6A:
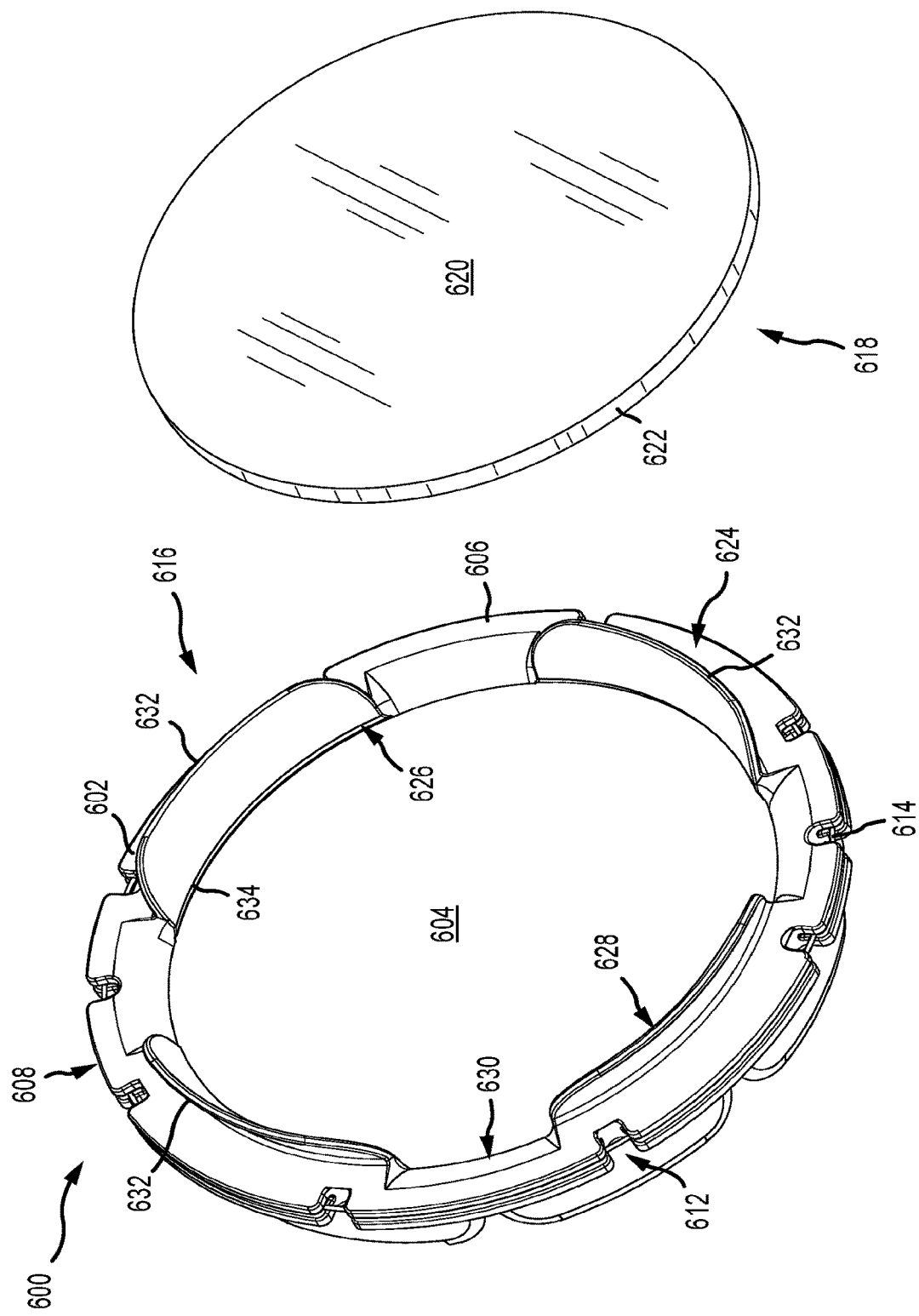
FIG. 6A illustrates a perspective view of a front side of an embodiment of a light ring with gel.
Figure 6B:
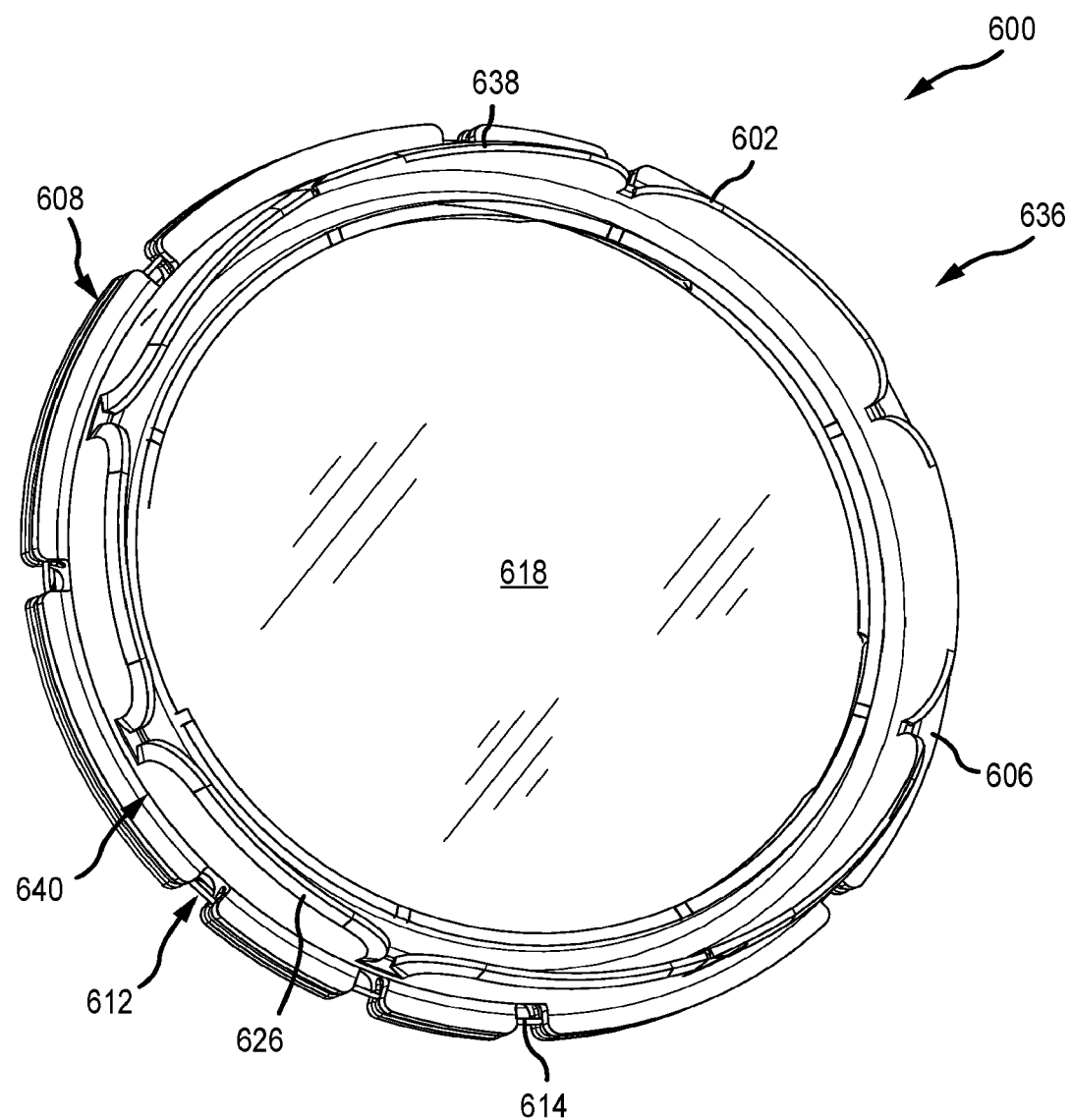
FIG. 6B illustrates a perspective view of a back side of an embodiment of a light ring and gel inserted.
Figure 6C:
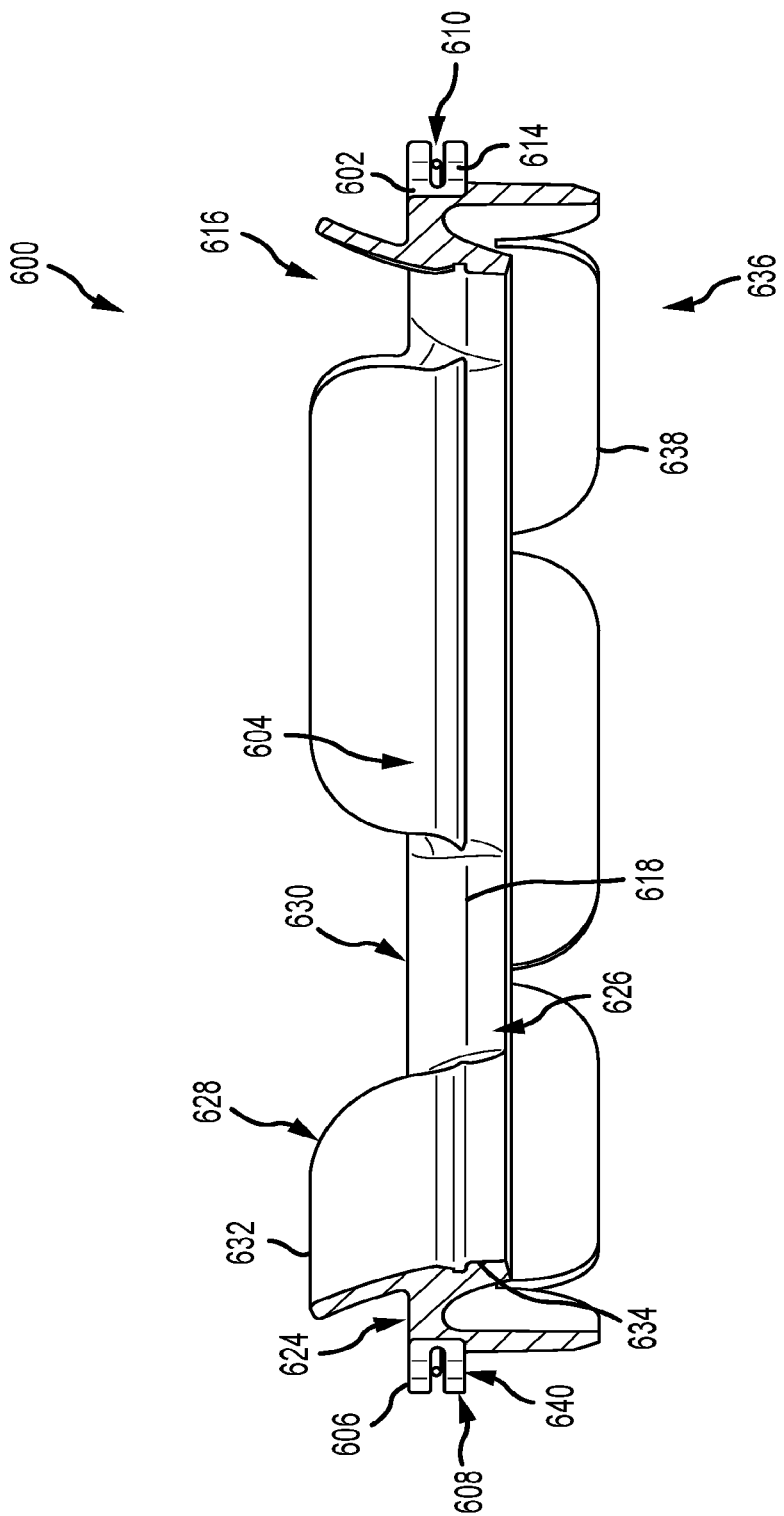
FIG. 6C illustrates a cross-sectional view of an embodiment of a light ring

With references to FIGS. 6A-6C, FIG. 6A illustrates an exploded perspective view of a front side 616 of an embodiment of a light ring 600. FIG. 6B illustrates a perspective view of a back side 636 of an embodiment of the light ring 600. FIG. 6C illustrates a cross-sectional view of and embodiment of the light ring 600. As illustrated, the light ring 600 has a body 602, which is illustrated as a ring. The body 602 defines an opening 604, which, when in use, facilitates light passing from a light source (e.g., a SPEED-LITE) to a target, such as the subject of a photograph. While the body 602 is illustrated as a ring in this embodiment, other shapes are also contemplated as required or desired. For example, the body 602 may be a polygonal prism shape such as a rectangle, a hexagon, or any other shape as required or desired.

The body 602 includes an outer circumferential flange 606 having an outer annular surface 608. A radially extending channel 610 is defined within the outer circumferential flange 606 and is open at the outer annular surface 608. A plurality of radial recesses 612 are also defined within the outer circumferential flange 606 and are circumferentially spaced around the body 602. The channel 610 within the circumferential flange 606 is shaped and sized to receive a connection element, such as a wire 614.

In operation, a proximal portion of a pivot arm is disposable within the recess 612. The pivot arm includes a bore which receives the connection element 614 so as to pivotally couple the pivot arm to the light ring 600. Because the recess 612 extends through the flange 606 the pivot arm may freely pivot (e.g., towards the front face or the back face) in relation to the light ring 600. Additionally, the channel 610 retains the wire 614 within the light ring 600. It is appreciated that the pivot arms may be pivotally coupled to the light ring 600 via any other connection method that enables the pivot arms to function as described herein. For example, each pivot arm may be individually coupled within the recesses 612 with discrete pivots. The pivot arm may also be coupled to the body 602 by a pin or a screw.

The body 602 has a front side 616 that is configured to receive and secure a light manipulating device 618 for use with the light ring 600. In some examples, the light manipulating device 618 may be removable from the body 602. The light manipulating device 618 may be a gel, lens filter, grid, or the like such that light passing through the opening 604 is manipulated by the light manipulating device 618. In the example, the light manipulating device 618 is a disk 620 with an outer surface 622 that covers the opening 604. The front side 616 includes a front face 624 that is positioned proximate the flange 606 and an inner annular surface 626 that receives and secures the light manipulating device 618.

In the example, the inner annular surface 626 includes a plurality of fin sections 628 and a plurality of curved sections 630. The fin sections 628 and the curved sections 630 are circumferentially spaced and alternate around the inner annular surface 626. The fin sections 628 include a projection portion 632 which is curvilinear to the front face 624 and extend away from front face 624. Opposite the projection portion 632, the fin sections 628 include a seat portion 634 formed within the inner annular surface 626 and which is configured to engage with the edge of the light manipulating device 618. The seat portion 634 prevents the light manipulating device 618 from being pushed all the way through the opening 604 and to the back side when it is installed on the body 602.

The curved sections 630 provide a taper from the front face 624 to the inner annular surface 626. As the light manipulating device 618 is slid into the seat portion 634, the curved sections 630 frictionally engage with the outer surface 622 of the light manipulating device 618 so as to secure and retain the light manipulating device 618 within the body 602. The combination of the seat portions 634 and the curved sections 630 enable a robust coupling between the light manipulating device 618 and the body 602, and reduce undesirable and unintentional de-coupling of the light manipulating device. 618. This type of connection also enables more than one light manipulating device 618 to be stacked together and secured within the light ring 600. The curved sections 630 may be used as access points to allow a user to slide an instrument, such as a finger, to dislodge the light manipulating device 618.

In alternative examples, the light manipulating device 618 may be secured to the front side 616 of the light ring 600 by any other system that enables the light ring 600 to function as described herein. For example, the front face 624 may include one or more flexible tabs which enable the light manipulating device 618 to be removably secured, a slot that enables the light manipulating device 618 to be slidingly secured on the front face 624, a hook and loop fastener connection, or any other connection as required or desired.

The body 602 also has a back side 636 that is configured to be received at least partially within the support ring. In the example, the back side 636 includes a plurality of pegs 638 extending from a back face 640 which is positioned proximate the flange 606. The pegs 638 are circumferentially spaced around the opening 604. The pegs 638 have a diameter that is greater than a diameter of the inner annular surface 626 such that the pegs 638 are spaced away from and outside of the inner annular surface 626. In the example, the pegs 638 are formed with a circumferential length around the body 602. In other examples, the pegs 638 may be posts or any other element that engages with the support ring.

Figure 7A:
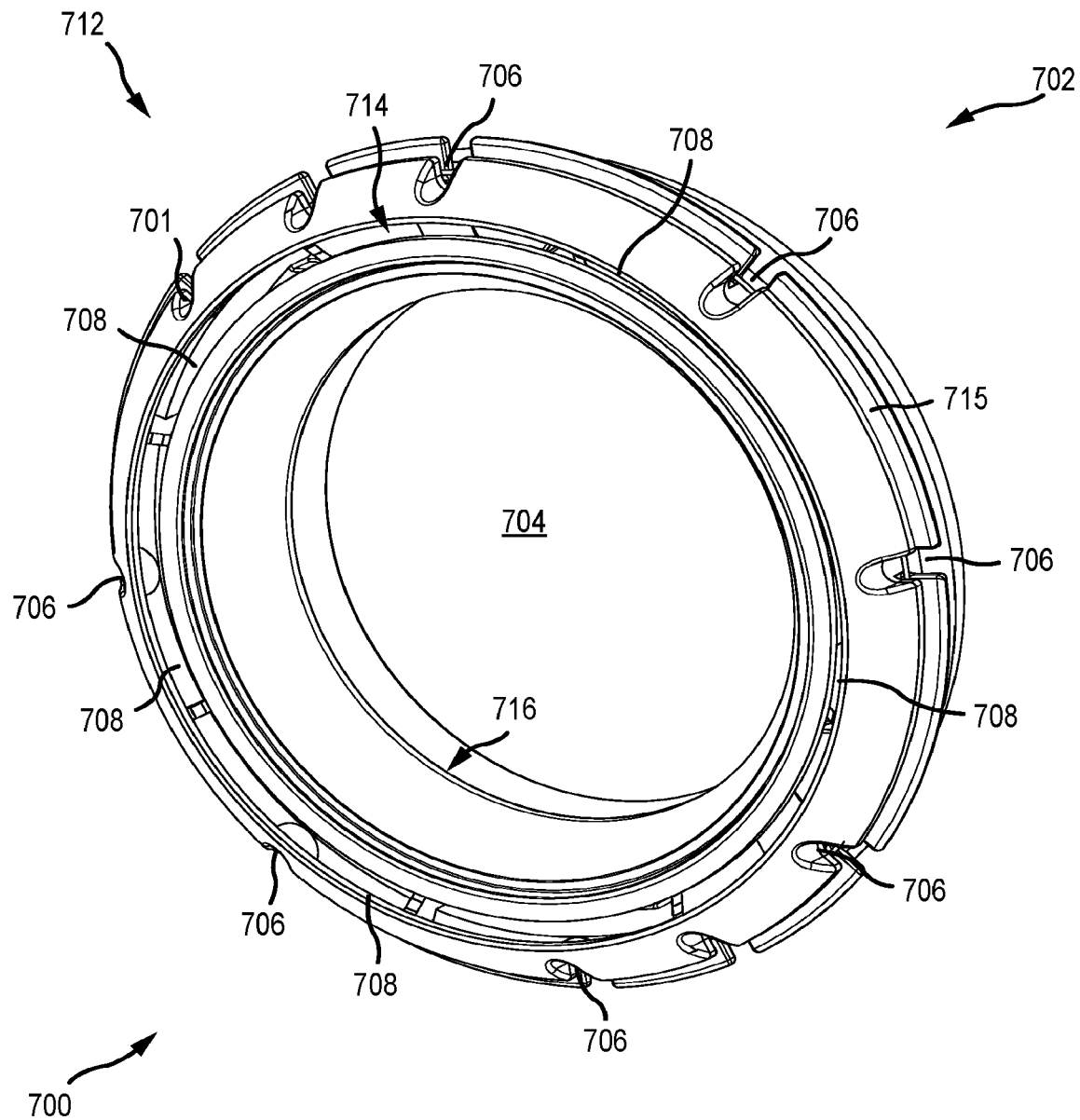
FIG. 7A illustrates a perspective view of a front side of an embodiment of a support ring.
Figure 7B:
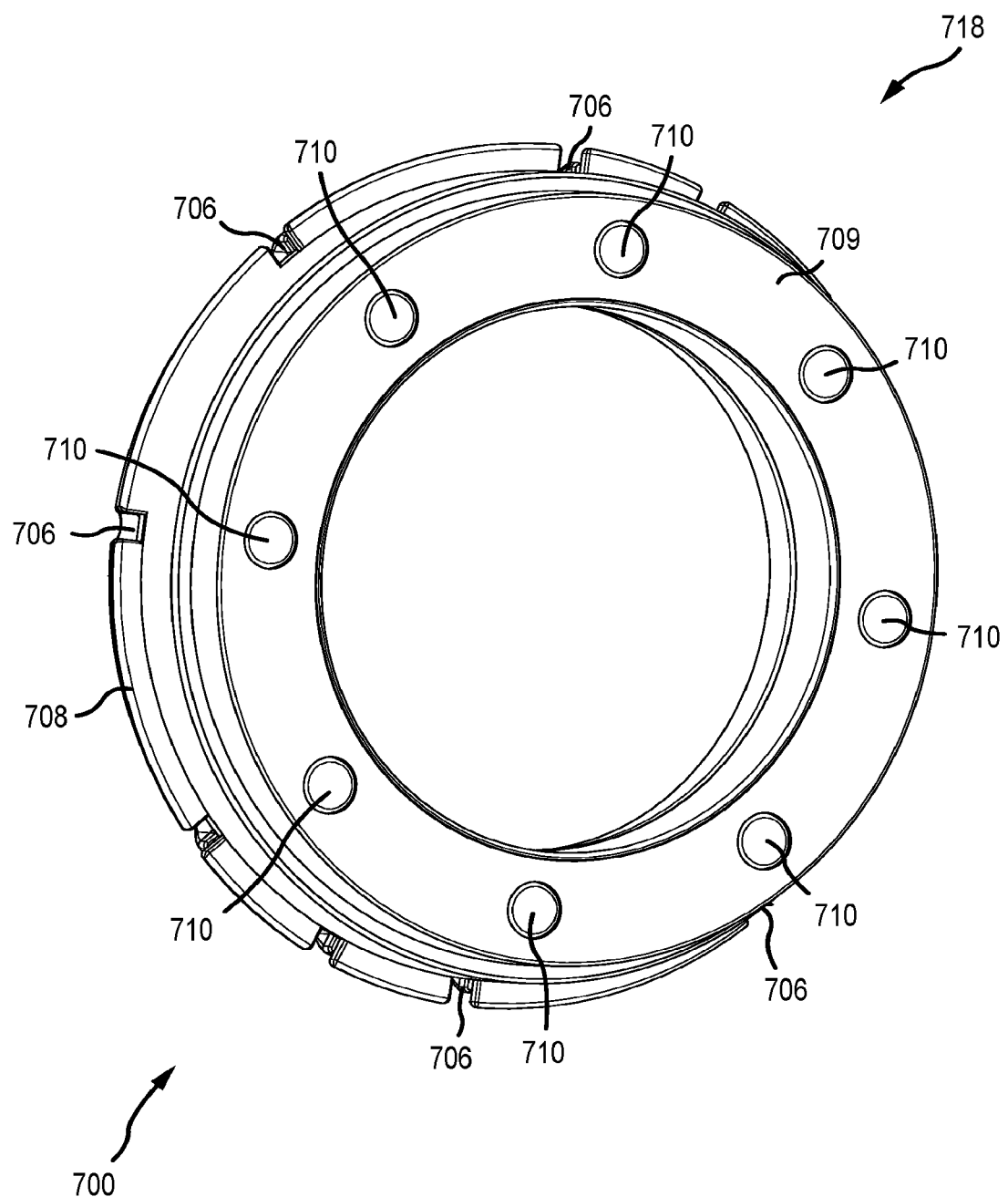
FIG. 7B illustrates a perspective view of a back side of an embodiment of a support ring.

FIG. 7A illustrates a perspective view of a front side of an embodiment support ring 700. FIG. 7B illustrates a perspective view of a back side of an embodiment of a support ring 700. As illustrated, the support ring 700 includes a body 702 defining an opening 704, and attachment elements 706. The support ring 700 additionally has a plurality of coupling elements 708 disposed about a face 714 of the front side 712 of the support ring 700.

As illustrated, the support ring has a body 702, which is in the shape of a ring. The body 702 defines an opening 704. Other shapes are contemplated, such as a body 702 with a rectangular prism shape. As illustrated, the opening is defined by an inner annular surface 716 of the body 702. The body 702 has an outer annular surface 715. Disposed about the outer annular surface 715 is a plurality of frame arm attachment elements 706. The frame arm attachment elements 706 may be a recess operative to receive a proximal end of a frame arm. The recess may further include a pin or screw that may be threaded into a bore of a proximal portion of a frame arm such that the frame arm is pivotally coupled to the support ring 700. In the example, the attachment element 706 includes a recess with a wire extending through as described above.

The support ring 700 additionally has a plurality of coupling elements 708 disposed about a face 714 of the front side 712 of the support ring 700. The coupling elements 708 are operative to couple to a light ring. As illustrated, the coupling elements 708 are channels (defined by the body 702) that are disposed on the face 714. The channels 708 form a partial race about the opening 704. The channels 708 may be operative to receive (e.g., be a receiving element) an element of a light ring, such as a peg, protrusion, or other structure. In other aspects of the technology, the coupling element may be a gasket, a hook-and-loop fastener, or other means to couple the front side 712 of the support ring to the back side of a light ring.

On the back side 718, the support ring 700 includes attachment elements 710. The attachment elements 710 pair with attachment elements located on a light source. This allows for the collapsible softbox to be removably coupleable to a light source. That is, in aspects of the technology, the body 702 includes, on the back side 718, a light source coupling surface 709. In the example, the light source coupling surface 709 includes a plurality of circumferentially spaced magnets as attachment elements 710 so that the support ring 700 is magnetically coupleable to a connector element on a light source. In other examples, the light source coupling surface 709 may include components for any other connection system such as, but not limited to, a snap connector, a clamp connector, a threaded connector, a hook-and-loop connector, or a dovetail connector as required or desired. This may be chosen based on the corresponding connection element on the light source.

Figure 8:
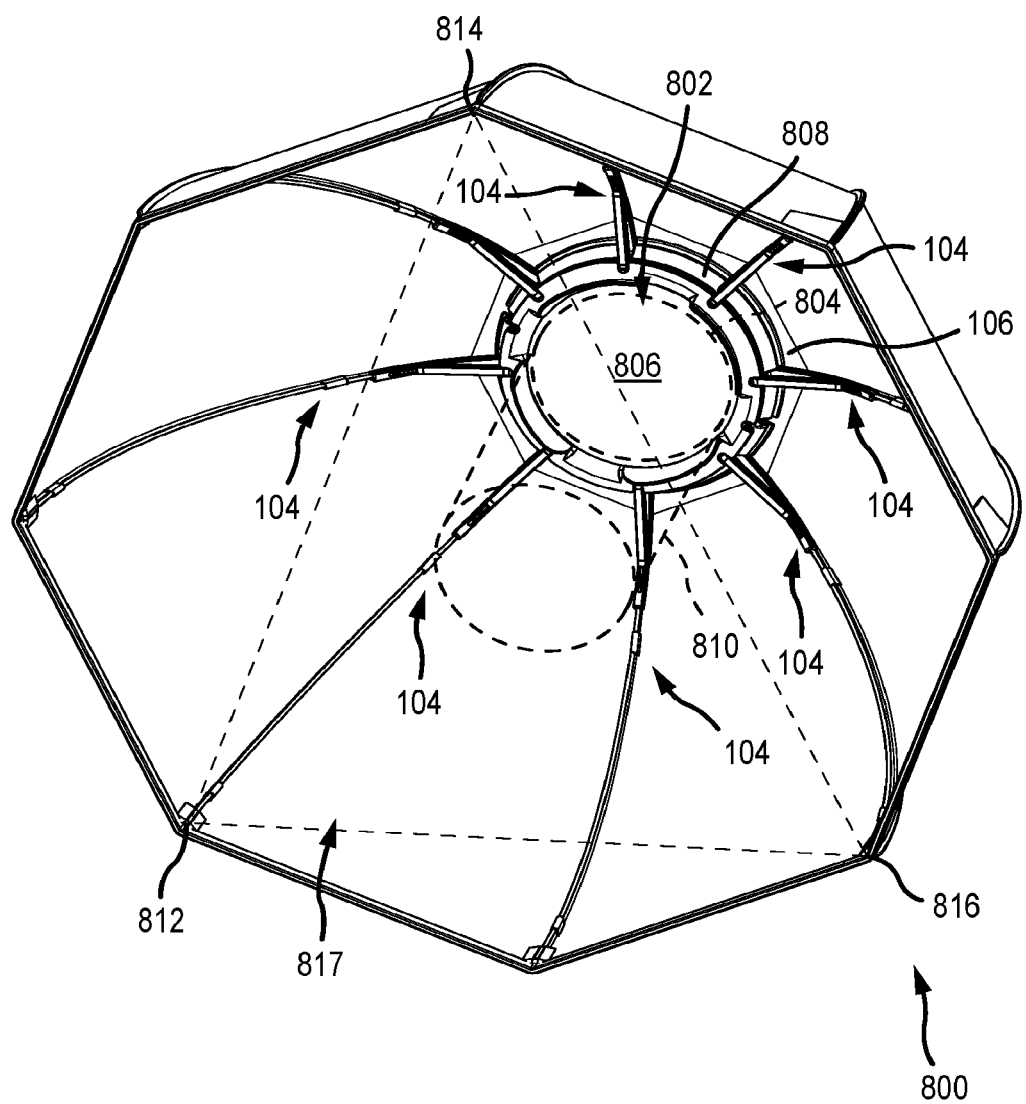
FIG. 8 illustrates an embodiment of a relatively obstruction free collapsible softbox.

FIG. 8 illustrates an embodiment of a relatively obstruction free collapsible softbox 800 in an expanded position. One way to characterize the property of being relatively obstruction free is to identify a volume of a shape 802 that extends from the opening 806 of the support-ring assembly 106 to the end of the soft box, which volume of a shape 802 does not contain any portion of the frame-arm assemblies 104. That is, when in an expanded position, the frame-arm assemblies 104 are entirely excluded from the volume of a shape 802. In aspects of the technology, the shape 802 is a cylindrical shape. For example, the illustrated shape 802 is defined as having a base 804 that is the area of the circle formed by the opening 806. In aspects, the opening 806 is defined by the inner annular wall of the light ring 808. The height 810 of the cylindrical shape 802 may be defined as a line extending orthogonally from the plane formed by the opening 806 and terminating at the plane 817 formed by a first frame-arm assembly 812, a second frame-arm assembly 814, and a third-frame arm assembly 816. In such an instance, the wall of the shape 802 is defined by the circumference of the circle of the opening 806 and the sum of all lines extending orthogonally from the circumference of the circle and terminating at the plane formed by a first frame-arm assembly 812, a second frame-arm assembly 814, and a third-frame arm assembly 816.

A benefit of having a relatively obstruction free softbox is that light coming from a light source that is parallel to the height 810 may pass through the volume of the shape 802 and exit the soft box without being obstructed by any portion of the plurality of frame arm assemblies 104. It will be appreciated that the shape may be of a different shape than a cylinder for a variety of reasons. This includes instances where the opening is not a circle, where the area of the opening and the plane are not parallel, etc. For example, where the opening is a square shape, the shape may be a rectangular prism.

Figure 9A:
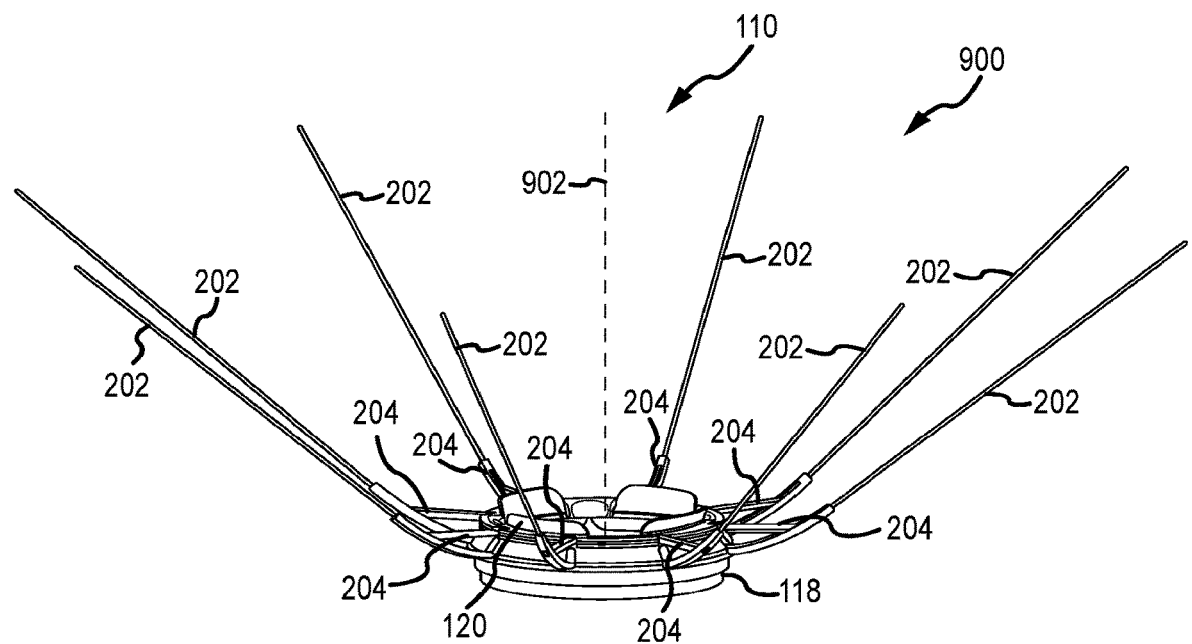
FIG. 9A illustrates an embodiment of a fully collapsed collapsible-frame assembly.
Figure 9B:
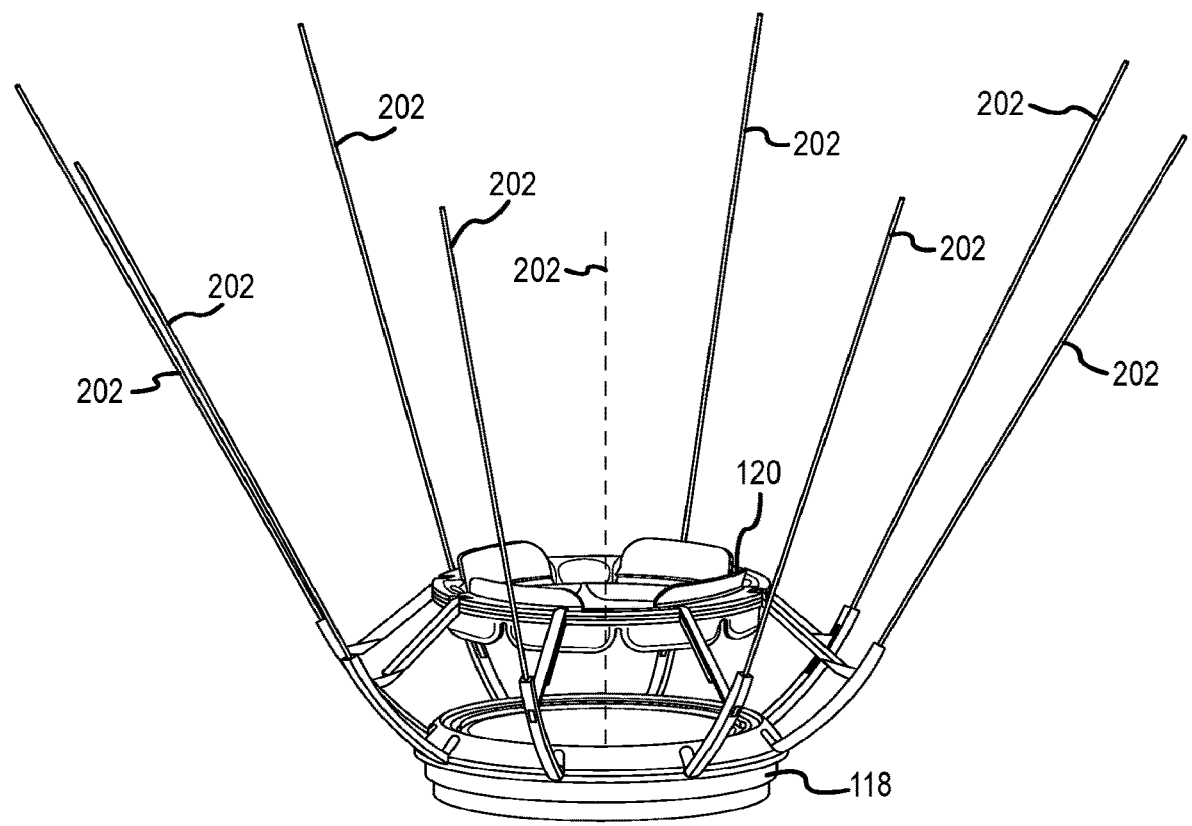
FIG. 9B illustrates an embodiment of a partially collapsed collapsible-frame assembly.
Figure 9C:
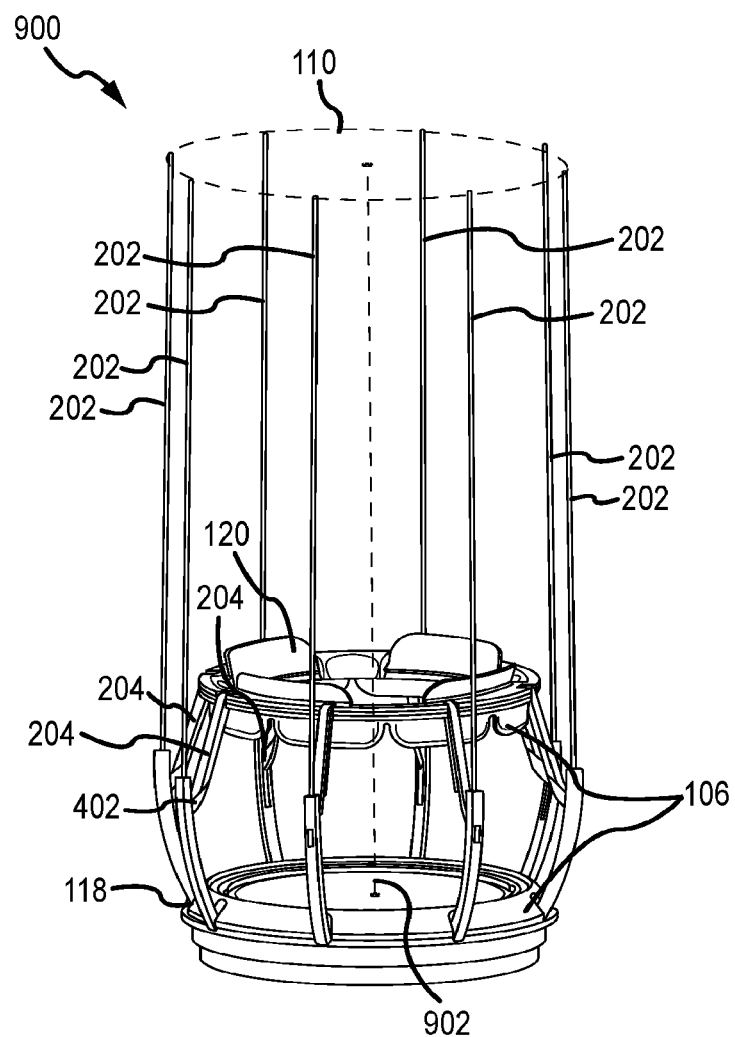
FIG. 9C illustrates an embodiment of a fully opened collapsible-frame assembly.

FIGS. 9A-9C illustrate various stages of collapsing a collapsible frame assembly 900. Specifically, FIG. 9A illustrates an embodiment of a fully opened collapsible-frame assembly, FIG. 9B illustrates an embodiment of a partially collapsed collapsible-frame assembly, and FIG. 9C illustrates an embodiment of a fully collapsed collapsible-frame assembly. It will be appreciated that like-numbered elements have the same or similar properties as those elements so numbered described above.

As illustrated by FIG. 9A, in a fully open position the support ring 118 and the light ring 120 of the collapsible frame assembly 900 are robustly coupled together. This causes the distal portion of the pivot arm 204 to push the frame arms 202 out such that the tips of the distal ends of the frame arms are spread outwardly away from a center axis 902. This results in the distal opening 110 to widen to such that the distal opening is larger than when in a fully collapsed position.

To collapse collapsible frame assembly 900, the support ring 118 may be separated from the light ring 120. This may be done by hand by pulling apart the support ring 118 and the light ring 120. This causes the distal end of the pivot arm 204 to swing inwardly pulling the proximate portion of the frame arms 202 toward the center axis 902. That is, the pivot arm 204 pivots about a pivot point on the distal portion of the pivot arm 204 such that the proximate portion of the pivot arm moves closer to the opening 110.

FIG. 9B illustrates a partially collapsed collapsible frame assembly 900. As illustrated, the support ring 118 and the light ring 120 have been partially separated. The pivot arm 204 has been pivoted such that the frame arms 202 have been drawn towards the center axis 902.

In a fully collapsed position, collapsible frame assembly 900, the support ring assembly 106 is separated into a support ring 118 and a light ring 120. In aspects, the proximal portion of the frame arm 202 servers as a stop to prevent the proximal portion 404 of the pivot arm 204 from further pivoting. In pivoting the pivot arms 204 such that the proximate portion 404 has swung out towards the distal opening 110 of the collapsible light box 900, the distal portion of the frame arms 202 of the collapsible light box 900 is moved toward a center axis 902. The result is that opening 110 is smaller than when in a fully open position.

Figure 10A:
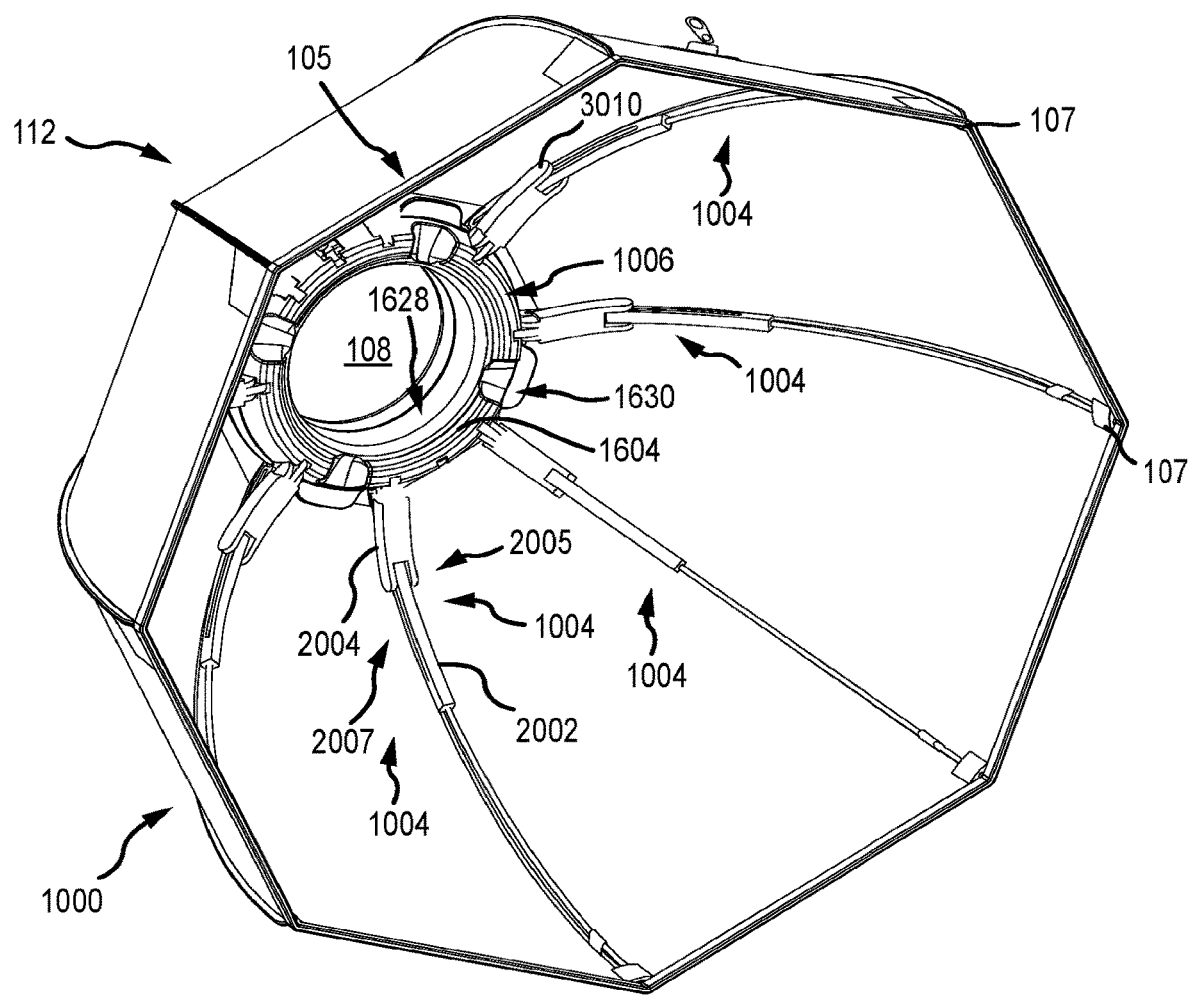
FIG. 10A illustrates a perspective view of an alternative embodiment of an obstruction-free collapsible softbox.
Figure 10B:
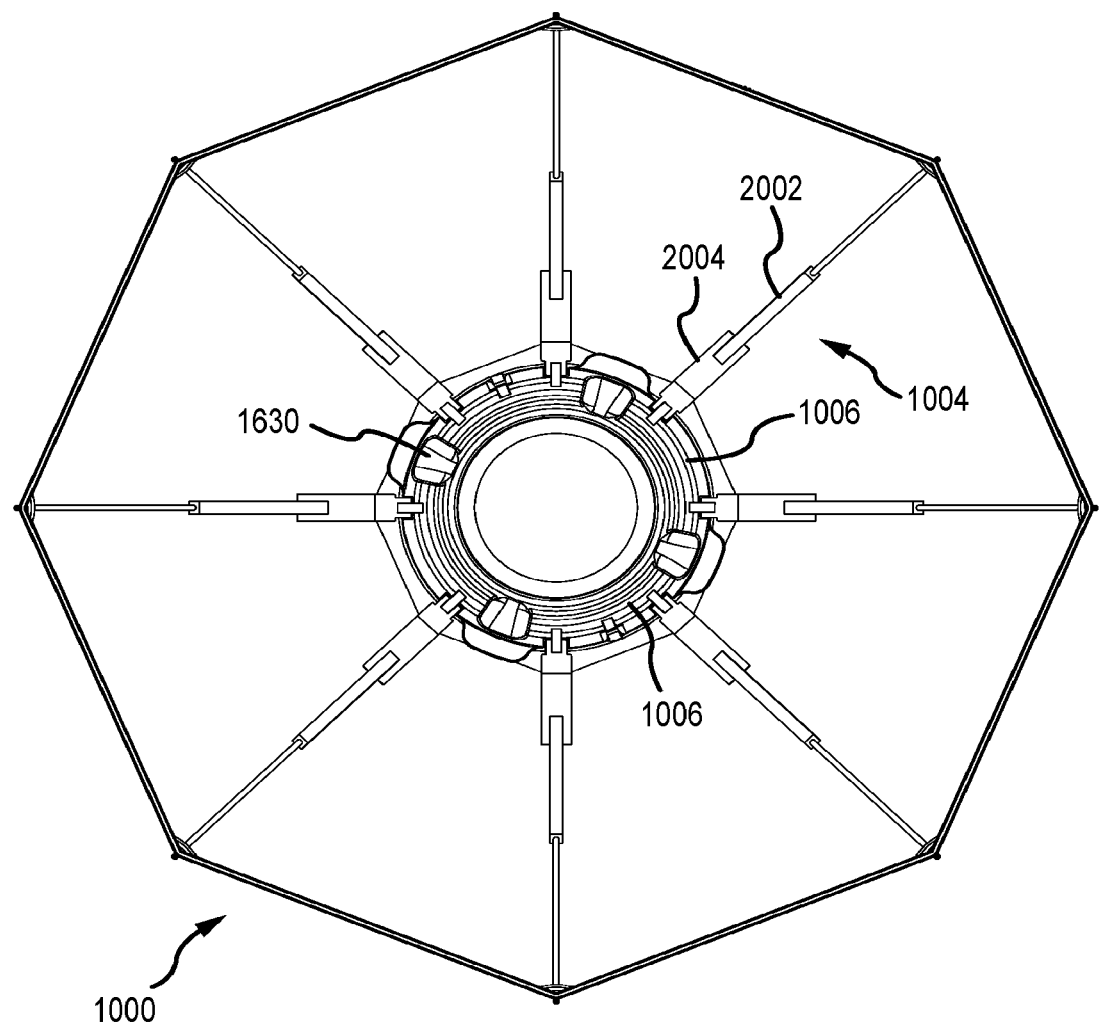
FIG. 10B illustrates a front view of an alternative embodiment of an obstruction-free collapsible softbox.

FIG. 10A and FIG. 10B illustrate an alternative embodiment of an obstruction-free softbox 1000. FIG. 10A illustrates a perspective view of an alternative embodiment of an obstruction-free collapsible softbox 1000. FIG. 10B illustrates a front view of an alternative embodiment of an obstruction-free collapsible softbox 1000. As illustrated the light ring 1006 has been modified as well as the frame-arm assembly 1004 from the light ring and frame arm assembly described with reference to FIGS. 1A-1D. It will be appreciated that other elements of FIGS. 10A and 10B are like numbered as those elements described above with reference to figures above, and those like numbered elements share the same or similar properties.

Further, it will be appreciated that while only certain frame arm assemblies 1004 have labeled elements to improve clarity of the illustration, all of the illustrated frame arm assemblies 1004 will have same elements, such as distal end 2005, engagement member 3010, etc. As illustrated, alternative frame arm assembly 1004 includes alternative pivot arm 2004. Alternative pivot arm 2004 has two protrusions at its distal end 2005, which serve to receive the proximal portion 2007 of the frame arm 2002. A pivot engagement member 3010 pivotally couples the distal end 2005 of the alternative pivot arm 2004 to the proximal portion 2007 of the frame arm 2002. It will be appreciated that the collapsible motion of the collapsible-frame assembly 103 does not substantially change in the alternative frame arm assembly 1004 compared that as described above. Rather, alternative frame arm assembly 1004 provides an alternative means to pivotally couple the alternative frame arm 2002 to the alternative pivot arm 2004.

Additionally illustrated is alternative light ring 1006. Alternative light ring has a wall 1604 on the front face (e.g., the face that is towards the distal end of the body of the obstruction free soft-box). In aspects of the technology, the alternative light ring has a body that defines an opening 108. As illustrated, the body opening 108 is a toris, with an inner surface. The alternative light ring 1006 is adapted to receive a gel, lens filter, grid, or the like such that light passing through the open 108 is manipulated by the light manipulating device.

In the alternative light ring 1006, the light ring body includes an engagement wall 1628 and a plurality of curved sections 1630. The curved sections 1630 are circumferentially spaced and alternate around the front face of the body of the light ring 1006. The engagement wall 1628 is raised above the curved sections 1630. The inner surface 1628 includes a seat portion formed within the inner surface 1628 and which is configured to engage with the edge of the light manipulating device. The inner surface 1628 seat portion prevents the light manipulating device from being pushed all the way through the opening 108 and to the back side when it is installed into the light ring. In aspects of the technology, the seat portion is a ledge. In other embodiments, the seat portion is a curved portion of the inner surface 1628.

In aspects of the technology, as the light manipulating device is slid into the inner surface 1628 toward the seat portion, the inner surface 1628 frictionally engages with an outer surface of the light manipulating device so as to secure and retain the light manipulating device against (e.g., the inner surface of the toris) of the body of the alternative light ring 1006. This type of connection also enables more than one light manipulating device 1618 to be stacked together and secured within the light ring 1006. The curved sections 1630 may be used as access points to allow a user to slide an instrument, such as a finger, to dislodge the light manipulating device.

Figure 11:
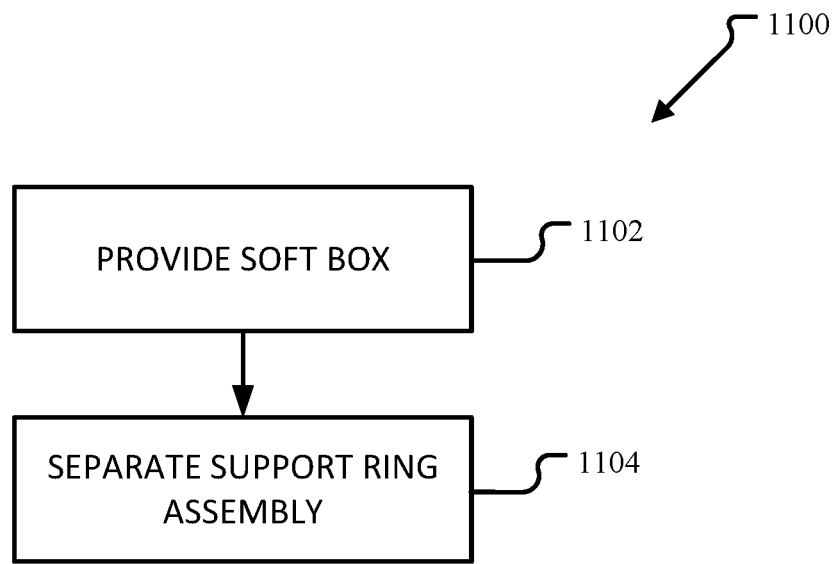
FIG. 11 illustrates a method for collapsing a relatively obstruction free collapsible soft-box.

FIG. 11 illustrates a method 1100 for collapsing a relatively obstruction free softbox. The method begins with provide a relatively obstruction free soft box operation 1102. In operation 1102, a relatively obstruction free softbox is provided. The softbox may have a support ring assembly that is capable of being separated into a support ring and light ring. The support ring and the light may be aligned such that a circle of the opening formed by the body of support ring is substantially parallel (e.g., within 3 degrees of parallel with each other) with a circle of the opening formed by the body of light ring. When the softbox is in an open position, the support ring and the light ring may be robustly coupled together.

The method 110 then proceeds to separate support ring assembly operation 1104. In operation 1104, the light ring and the support ring are separated. Separation may occur by applying a force to move the light ring away from the support ring. In aspects, the circle of the light ring remains substantially parallel as the light rings are separated along a center axis. In aspects, such separation causes the distal end of a pivot arm to be drawn inward, which causes the distal end of a frame arm to be drawn inward.

The materials utilized in the mounting devices described herein may be those typically utilized for camera and camera accessory manufacture. For example, moldable plastics may be used for the housing, while aluminum, steel, stainless steel, zinc, or composite materials can be utilized for the other components. In some examples, the housing and the bracket may be unitary formed.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In other words, functional elements being performed by a single or multiple components and individual functions can be distributed among different components. In this regard, any number of the features of the different embodiments described herein may be combined into one single embodiment and alternate embodiments having fewer than or more than all of the features herein described as possible.

While various embodiments have been described for purposes of this disclosure, various changes and modifications may be made which are well within the scope of the disclosed methods. Numerous other changes may be made which will readily suggest themselves to those skilled in the art and which are encompassed in the spirit of the disclosure.

What is claimed is:

1. A softbox system comprising:
    a body supported by a plurality of frame-arm assemblies, each frame-arm assembly having a proximal end coupled to a support-ring assembly such that, when the plurality of frame-arm assemblies are in an expanded position, the body forms a proximal opening and a distal opening, wherein the support ring assembly comprises a ring having a body with a ring opening defined by an inner annular surface;

a light manipulating device having an outer surface and is removably coupled to the inner annular surface;

wherein a volume of a cylinder is defined by the ring opening as the cylinder's base and a line as the cylinder's height, the line extending orthogonally from the plane formed by the ring opening and terminating at a plane formed by distal ends of at least three of the plurality of frame-arm assemblies, wherein the volume of the cylinder does not contain any of the plurality of the frame arm assemblies when the plurality of frame-arm assemblies are in an expanded position;

wherein the support-ring assembly further comprises:
  a back side having a light coupling mechanism, wherein the light coupling mechanism comprises a plurality of circumferentially spaced magnets.

2. The softbox system of claim 1 wherein the plurality of frame-arm assemblies includes a first frame-arm assembly having a first distal end and a second frame-arm assembly having a second distal end, wherein a distance between the first distal end and the second distal end is reduced when the plurality of frame-arm assemblies are in a collapsed position.

3. The softbox of claim 1, wherein the body comprises a webbing or a flexible fabric.

4. The softbox system of claim 1, wherein the plurality of frame-arm assemblies are disposed within the body.

5. The system of claim 1, wherein the light manipulating device comprises a gel, a lens filter, or a grid.

6. A softbox system comprising:
  a body supported by a plurality of frame-arm assemblies, each frame-arm assembly having a proximal end coupled to a support-ring assembly such that, when the plurality of frame-arm assemblies are in an expanded position, the body forms a proximal opening and a distal opening, wherein the support ring assembly comprises a ring having a body with a ring opening defined by an inner annular surface;

a light manipulating device having an outer surface and is removably coupled to the inner annular surface;

wherein a volume of a cylinder is defined by the ring opening as the cylinder's base and a line as the cylinder's height, the line extending orthogonally from the plane formed by the ring opening and terminating at a plane formed by distal ends of at least three of the plurality of frame-arm assemblies, wherein the volume of the cylinder does not contain any of the plurality of the frame arm assemblies when the plurality of frame-arm assemblies are in an expanded position;

wherein the light manipulating device comprises a gel, a lens filter, or a grid.

7. The system of claim 6, wherein the support-ring assembly further comprises: a back side having a light coupling mechanism.

8. The system of claim 7, wherein the light coupling mechanism comprises a plurality of circumferentially spaced magnets.

9. The softbox system of claim 6, wherein the plurality of frame-arm assemblies includes a first frame-arm assembly having a first distal end and a second frame-arm assembly having a second distal end, wherein a distance between the first distal end and the second distal end is reduced when the plurality of frame-arm assemblies are in a collapsed position.

10. The softbox of claim 6, wherein the body comprises a webbing or a flexible fabric.

11. The softbox system of claim 6, wherein the plurality of frame-arm assemblies are disposed within the body.

* * * * *